(12) United States Patent
Wieland et al.

(10) Patent No.: US 11,928,628 B2
(45) Date of Patent: Mar. 12, 2024

(54) METHOD FOR CHECKING WORKPIECES, CHECKING FACILITY AND TREATMENT FACILITY

(71) Applicant: Dürr Systems AG, Bietigheim-Bissingen (DE)

(72) Inventors: Dietmar Wieland, Waiblingen (DE); Oliver Iglauer-Angrik, Stuttgart (DE); Kevin Woll, Heilbronn (DE); Andreas Gienger, Kirchheim unter Teck (DE); Oliver Sawodny, Stuttgart (DE)

(73) Assignee: Dürr Systems AG, Stuttgart (DE)

( * ) Notice: Subject to any disclaimer, the term of this patent is extended or adjusted under 35 U.S.C. 154(b) by 69 days.

(21) Appl. No.: 17/608,467

(22) PCT Filed: Apr. 29, 2020

(86) PCT No.: PCT/DE2020/100355
§ 371 (c)(1),
(2) Date: Nov. 2, 2021

(87) PCT Pub. No.: WO2020/224713
PCT Pub. Date: Nov. 12, 2020

(65) Prior Publication Data
US 2022/0215305 A1 Jul. 7, 2022

(30) Foreign Application Priority Data

May 9, 2019 (DE) ..................... 10 2019 112 099.3
May 10, 2019 (DE) ..................... 10 2019 206 846.4

(51) Int. Cl.
*G06Q 10/0633* (2023.01)
*G05B 19/418* (2006.01)
(Continued)

(52) U.S. Cl.
CPC ... *G06Q 10/0633* (2013.01); *G05B 19/41875* (2013.01); *G06Q 10/06395* (2013.01);
(Continued)

(58) Field of Classification Search
CPC ....... G05B 1/00–2223/00; G06Q 10/00–50/00
(Continued)

(56) References Cited

U.S. PATENT DOCUMENTS

| 4,186,793 A * | 2/1980 | Teplinsky | ............... B22D 47/00 164/168 |
| 5,341,304 A | 8/1994 | Sakamoto et al. | |

(Continued)

FOREIGN PATENT DOCUMENTS

| CN | 109270907 A | 1/2019 |
| DE | 41 13 556 A1 | 10/1991 |

(Continued)

OTHER PUBLICATIONS

Andrew Kusiak et al., "The prediction and diagnosis of wind turbine faults," dated Jun. 9, 2010, Elsevier, 9 pages.
(Continued)

*Primary Examiner* — Alan S Miller
(74) *Attorney, Agent, or Firm* — HANLEY, FLIGHT & ZIMMERMAN, LLC

(57) ABSTRACT

In order to provide a checking facility for checking workpieces and also a treatment facility for treating workpieces, which enable efficient and reliable quality optimisation, it is proposed that workpiece parameters are detected, for example by means of an automatic checking station, and a workpiece-specific data set is created on this basis and/or from facility parameters.

20 Claims, 11 Drawing Sheets

(51) Int. Cl.
  *G06Q 10/0639* (2023.01)
  *G06Q 50/04* (2012.01)
(52) U.S. Cl.
  CPC ... *G06Q 50/04* (2013.01); *G05B 2219/32217* (2013.01); *G05B 2219/37206* (2013.01); *G05B 2219/45013* (2013.01)
(58) Field of Classification Search
  USPC .............................................. 705/7.11–7.42
  See application file for complete search history.

(56) References Cited

U.S. PATENT DOCUMENTS

| | | | |
|---|---|---|---|
| 5,844,802 | A | 12/1998 | Lepper et al. |
| 6,070,128 | A * | 5/2000 | Descales ............. B01J 19/0006 |
| | | | 702/30 |
| 6,141,598 | A | 10/2000 | Nam |
| 6,516,239 | B1 | 2/2003 | Madden et al. |
| 6,528,109 | B1 | 3/2003 | Filev et al. |
| 6,627,006 | B1 * | 9/2003 | Bartik-Himmler .... G05D 21/02 |
| | | | 148/241 |
| 6,801,822 | B1 | 10/2004 | Fujiwara et al. |
| 6,850,874 | B1 * | 2/2005 | Higuerey ................. B23H 7/20 |
| | | | 703/4 |
| 7,236,846 | B1 * | 6/2007 | Koyama ................ G06Q 50/04 |
| | | | 700/110 |
| 7,246,156 | B2 | 7/2007 | Ginter et al. |
| 11,353,835 | B2 | 6/2022 | Kobayashi et al. |
| 2003/0061583 | A1 | 3/2003 | Malhotra |
| 2003/0069781 | A1 * | 4/2003 | Hancock ................ G06Q 30/02 |
| | | | 705/7.39 |
| 2004/0025972 | A1 * | 2/2004 | Bartik-Himmler ..... C23C 22/00 |
| | | | 148/241 |
| 2004/0059553 | A1 * | 3/2004 | Heidemann ............... G06F 8/34 |
| | | | 703/6 |
| 2005/0010321 | A1 | 1/2005 | Contos et al. |
| 2006/0190110 | A1 | 8/2006 | Holt et al. |
| 2006/0257237 | A1 | 11/2006 | McDonald et al. |
| 2006/0259198 | A1 | 11/2006 | Brcka et al. |
| 2007/0220330 | A1 | 9/2007 | Nauerz et al. |
| 2007/0226540 | A1 | 9/2007 | Konieczny |
| 2009/0143872 | A1 | 6/2009 | Thiele et al. |
| 2009/0216393 | A1 | 8/2009 | Schimert |
| 2009/0250346 | A1 | 10/2009 | Weschke et al. |
| 2010/0083029 | A1 | 4/2010 | Erickson et al. |
| 2010/0161141 | A1 | 6/2010 | Herre et al. |
| 2011/0270482 | A1 | 11/2011 | Holzer |
| 2012/0254141 | A1 | 10/2012 | Poland et al. |
| 2013/0173332 | A1 | 7/2013 | Ho et al. |
| 2014/0351642 | A1 | 11/2014 | Bates et al. |
| 2014/0358601 | A1 | 12/2014 | Smiley et al. |
| 2015/0277429 | A1 | 10/2015 | Drath et al. |
| 2016/0193620 | A1 * | 7/2016 | Schulze .................. B05B 12/08 |
| | | | 239/69 |
| 2017/0041452 | A1 * | 2/2017 | Amann ................... H04W 4/70 |
| 2017/0139382 | A1 | 5/2017 | Sayyarrodsari et al. |
| 2017/0185058 | A1 * | 6/2017 | Holverson ............. G06Q 10/06 |
| 2018/0036845 | A1 | 2/2018 | Thorwarth |
| 2018/0293673 | A1 | 10/2018 | Ortiz Obando |
| 2018/0326591 | A1 | 11/2018 | Hausler |
| 2019/0019096 | A1 | 1/2019 | Yoshida et al. |
| 2019/0151924 | A1 | 5/2019 | Nillies |
| 2019/0179282 | A1 * | 6/2019 | Götz .................. G05B 19/0428 |
| 2019/0204815 | A1 * | 7/2019 | Ota ................... G05B 19/41875 |
| 2019/0383599 | A1 | 12/2019 | Gregory et al. |
| 2020/0012270 | A1 * | 1/2020 | Hollender .......... G05B 23/0229 |
| 2020/0055558 | A1 | 2/2020 | Damoulis et al. |
| 2020/0216130 | A1 | 7/2020 | Von Krauland |
| 2020/0401965 | A1 | 12/2020 | Wu et al. |
| 2021/0223167 | A1 * | 7/2021 | Jagiella ................. G06N 20/00 |
| 2021/0261374 | A1 * | 8/2021 | Celli ....................... B65H 18/08 |
| 2022/0197271 | A1 | 6/2022 | Alt et al. |
| 2022/0214670 | A1 | 7/2022 | Herre et al. |
| 2022/0214671 | A1 | 7/2022 | Alt et al. |
| 2022/0214676 | A1 | 7/2022 | Gienger et al. |
| 2022/0237064 | A1 | 7/2022 | Alt et al. |

FOREIGN PATENT DOCUMENTS

| | | |
|---|---|---|
| DE | 10 2004 048 937 A1 | 5/2005 |
| DE | 10 2004 019 151 A1 | 11/2005 |
| DE | 10 2004 024 262 A1 | 12/2005 |
| DE | 10 2006 022 614 A1 | 11/2006 |
| DE | 10 2006 045 429 A1 | 4/2007 |
| DE | 10 2006 055 297 A1 | 5/2008 |
| DE | 10 2006 056 879 A1 | 6/2008 |
| DE | 10 2008 062 630 A1 | 6/2010 |
| DE | 10 2008 060 115 B4 | 8/2010 |
| DE | 10 2012 213 481 A1 | 2/2014 |
| DE | 10 2014 201 273 A1 | 7/2015 |
| DE | 10 2015 119 240 B3 | 3/2017 |
| DE | 10 2016 012 451 A1 | 1/2018 |
| DE | 10 2017 101 228 A1 | 7/2018 |
| DE | 10 2017 208 103 A1 | 11/2018 |
| DE | 10 2017 113 343 A1 | 12/2018 |
| DE | 10 2017 217 760 A1 | 4/2019 |
| EP | 1 081 569 A2 | 3/2001 |
| EP | 1 176 388 A2 | 1/2002 |
| EP | 3 398 698 A1 | 11/2018 |
| WO | 2017/086194 A1 | 5/2017 |
| WO | 2020062186 A1 | 4/2020 |

OTHER PUBLICATIONS

Zhenyu Wu et al., "An Integrated Ensemble Learning Model for Imbalanced Fault Diagnostics and Prognostics," dated Feb. 19, 2018, IEEE Access, 10 pages.
European Patent Office, International Search Report, Issued in connection with Application No. PCT/DE2020/100358, dated Jul. 15, 2020, 6 pages.
European Patent Office, Written Opinion, issued in connection with Application No. PCT/DE2020/100358, dated Jul. 15, 2020, 8 pages.
European Patent Office, International Search Report, issued in connection with Application No. PCT/DE2020/100360, dated Jul. 15, 2020, 6 pages.
European Patent Office, Written Opinion, issued in connection with Application No. PCT/DE2020/100360, dated Jul. 15, 2020, 8 pages.
European Patent Office, International Search Report, issued in connection with Application No. PCT/DE2020/100357, dated Aug. 11, 2020, 6 pages.
European Patent Office, Written Opinion, issued in connection with Application No. PCT/DE2020/100357, dated Aug. 11, 2020, 6 pages.
European Patent Office, International Search Report, issued in connection with Application No. PCT/DE2020/100359, dated Oct. 13, 2020, 8 pages.
European Patent Office, Written Opinion, Issued in connection with Application No. PCT/DE2020/100359, dated Oct. 13, 2020, 15 pages.
European Patent Office, International Search Report, issued in connection with Application No. PCT/DE2020/100356, dated Oct. 13, 2020, 8 pages.
European Patent Office, Written Opinion, issued in connection with Application No. PCT/DE2020/100356, dated Oct. 13, 2020, 13 pages.
European Patent Office, International Search Report, issued in connection with Application No. PCT/DE2020/100355, dated Oct. 21, 2020, 8 pages.
European Patent Office, Written Opinion, issued in connection with Application No. PCT/DE2020/100355, dated Oct. 21, 2020, 13 pages.
United States Patent and Trademark Office, "Non-Final Office Action," issued in connection with U.S. Appl. No. 17/608,472, dated Jan. 18, 2023, 14 pages.
Google, "Google Scholar/Patents search—text refined: Industrial plant fault cause historical database," Google, retrieved Jan. 11, 2023, 3 pages.

(56) References Cited

OTHER PUBLICATIONS

United States Patent and Trademark Office, "Non-Final Office Action," issued in connection with U.S. Appl. No. 17/608,473, dated Mar. 31, 2023, 12 pages.

Karami et al., "Fault Detection and Diagnosis for Nonlinear Systems: A New Adaptive Gaussian Mixture Modeling Approach," Elsevier, Energy & Buildings, vol. 166, 2018, 12 pages.

United States Patent and Trademark Office, "Non-Final Office Action," issued in connection with U.S. Appl. No. 17/608,469, dated Apr. 5, 2023, 22 pages.

Lange, "Machine Learning Based Error Prediction for Spray Painting Applications," Chalmers University of Technology and University of Gothenburg, 2016, 59 pages.

United States Patent and Trademark Office, "Final Office Action," issued in connection with U.S. Appl. No. 17/608,472, dated Jun. 20, 2023, 16 pages.

Google, "Google Scholar/Patents search—text refined: Industrial plant fault database," Google, retrieved Jun. 14, 2023, 2 pages.

United States Patent and Trademark Office, "Final Office Action," issued in connection with U.S. Appl. No. 17/608,472, dated Jun. 29, 2023, 17 pages.

United States Patent and Trademark Office, "Advisory Action," issued in connection with U.S. Appl. No. 17/608,472, dated Sep. 15, 2023, 16 pages.

European Patent Office, "Communication Under Article 94(3) EPC," issued in connection with European Application No. 20 728 915.8, dated Sep. 18, 2023, 10 pages, with machine English translation.

United States Patent and Trademark Office, "Notice of Allowance and Fee(s) Due," issued in connection with U.S. Appl. No. 17/608,469, dated Oct. 18, 2023, 12 pages.

United States Patent and Trademark Office, "Non-Final Office Action," issued in connection with U.S. Appl. No. 17/608,472, dated Oct. 19, 2023, 18 pages.

Google, "Google Scholar/Patents search—industrial plant fault database," Google, retrieved Oct. 13, 2023, 2 pages.

United States Patent and Trademark Office, "Final Office Action," issued in connection with U.S. Appl. No. 17/608,473, dated Oct. 26, 2023, 12 pages.

United States Patent and Trademark Office, "Notice of Allowability," issued in connection with U.S. Appl. No. 17/608,469, dated Oct. 31, 2023, 10 pages.

United States Patent and Trademark Office, "Notice of Allowance and Fee(s) Due," issued in connection with U.S. Appl. No. 17/608,469, dated Dec. 7, 2023, 9 pages.

United States Patent and Trademark Office, "Non-Final Office Action," issued in connection with U.S. Appl. No. 17/608,468, dated Dec. 22, 2023, 20 pages.

United States Patent and Trademark Office, "Non-Final Office Action," issued in connection with U.S. Appl. No. 17/608,470, dated Jan. 19, 2024, 19 pages.

* cited by examiner

METHOD FOR CHECKING WORKPIECES, CHECKING FACILITY AND TREATMENT FACILITY

RELATED APPLICATIONS

This application is a national Phase of international application No. PCT/DE2020/100355, filed on Apr. 29, 2020, and claims the benefit of German application No. 10 2019 112 099.3, filed on May 9, 2019, and German application No. 10 2019 206 846.4, filed on May 10, 2019, all of which are incorporated herein by reference in their entireties and for all purposes.

FIELD OF DISCLOSURE and BACKGROUND

The present disclosure relates to the field of workpiece manufacture, in particular the manufacture of vehicle bodies. During or after the manufacture of workpieces, for example, a manual or automatic checking of said workpieces for manufacturing faults can be carried out. However, such a conventional checking usually does not allow a meaningful and/or 100% reliable conclusion to be drawn with regard to systematic production faults.

SUMMARY

An object of the present disclosure is to provide a method for checking workpieces, by means of which an efficient workpiece check for optimising the workpiece quality and/or for optimising production processes is possible.

This object is achieved according to examples disclosed herein by a method in accordance with claim 1.

The present disclosure also relates to a checking facility for checking workpieces and to a treatment facility for treating workpieces. The object of examples disclosed herein in this regard is also to make workpiece checking more efficient and to optimise the quality of the workpieces and production processes.

This object is achieved with the independent device claims.

Various aspects of the method and the devices are discussed below. All the mentioned features and/or advantages can be used in any combination to optimise examples disclosed herein. In particular, method features and resulting device features can be used to refine the devices. In addition, device features and resulting method features can be used to refine the method.

Preferably, a workpiece check is configured such that an artificial intelligence (AI) suggests and/or automatically implements measures for process optimisation, material optimisation and/or production optimisation, in particular by control interventions in a facility control system.

The method for checking workpieces can be used in particular for checking vehicle bodies and attachment parts.

The workpieces are then, in particular, vehicle bodies which are used, for example, as a component of motor vehicles such as cars, lorries, etc.

The method for checking workpieces preferably comprises the following step: determining one or more workpiece parameters of the workpieces to be checked and/or one or more facility parameters of a treatment facility for treating the workpieces to be checked.

A treatment of a workpiece can be, for example, a mechanical (surface) processing.

Preferably, however, the treatment of a workpiece is a treatment of a surface of a material of the workpiece. For example, a treatment can be a refinement of a surface of the material of the workpiece by applying and/or producing one or more, in particular protective, paint layers or other coatings.

Preferably, the method further comprises the following step: processing and/or compiling the one or more workpiece parameters and/or the one or more facility parameters, wherein a workpiece-specific data set is created for each workpiece.

The aforementioned processing and/or compilation of workpiece parameters and/or facility parameters can preferably result in the creation of an optimised database for checking of the workpieces, which ultimately enables better verifiability of the workpiece quality and also allows conclusions to be drawn about facility parameters and/or workpiece properties to be optimised.

A workpiece-specific data set is in particular a data set associated with a single workpiece.

Each data set can preferably be evaluated to determine the quality of the workpieces.

A data set can also preferably be a quality card or quality certificate from which the customer can see that all specifications and requirements for a correctly manufactured product have been met, at least within predefined limit values and/or tolerances.

Furthermore, a workpiece-specific data set can optionally contain data from initialisation processes and/or calibration processes, for example, for comparison purposes. For example, data of a sample workpiece can be included in a workpiece-specific data set in order to enable easier comparability of the data, in particular parameters, associated with the particular individual workpiece with reference data. The reference data can be or comprise limit values or value ranges in particular. Furthermore, the reference data can consist of simulated data or comprise such data within a predefined tolerance band.

It can be advantageous if the data sets are used to determine individually for each workpiece or jointly for a plurality of workpieces whether the treatment of the particular workpiece or workpieces has led or will lead to a treatment result within predefined quality criteria. The workpiece-specific data sets can thus be evaluated in particular still during the workpiece treatment or after the workpiece treatment, in particular at the latest immediately after the workpiece treatment. Furthermore, alternatively or additionally to this, an evaluation, in particular a statistical evaluation, can be provided at the end of a workpiece treatment.

It can be advantageous if the determination of whether the treatment of the particular workpiece or workpieces has led or will lead to a treatment result within predefined quality criteria is carried out before the treatment of the particular workpiece or workpieces, during the treatment of the particular workpiece or workpieces and/or after the treatment of the particular workpiece or workpieces.

In particular, if, for this determination, workpiece parameters and/or facility parameters are used which relate to a pre-treatment, pre-processing or previous manufacture of the workpiece before one or more treatment steps are carried out, possible defects on the workpiece can preferably be concluded at least insofar as these result from the pre-treatment, pre-machining, design of a material surface and/or manufacture of the workpiece.

For example, in the case of defects in the body-in-white of a workpiece formed as a vehicle body and/or generally in the case of defects in the material used for the manufacture and/or processing and/or treatment of a workpiece, it can already be concluded before the workpiece treatment that the workpiece cannot ultimately be completed without defects.

In particular, individual or multiple parameters from the following can be provided as workpiece parameters:
- a workpiece temperature measured locally on the workpiece;
- areally measured and/or averaged workpiece temperature or workpiece temperature distribution;
- local speed, measured in particular by means of a sensor in the form of an anemometer, in particular flow speed of the air at and/or around the workpiece;
- reflection properties of a workpiece surface, in particular measured reflection properties; in particular, the measurement can be carried out by means of light in the ultra-violet, visible and/or infra-red range;
- absorption properties of a workpiece surface, in particular measured absorption properties; here, in particular, the absorption properties for light in the ultra-violet range, in the visible range and/or in the infra-red range, for example in the range of thermal radiation, can be measured;
- emission properties of a workpiece surface, in particular measured emission properties; the emission is measured in particular in the infra-red range, for example on the basis of the thermal radiation of the workpiece;
- local workpiece temperature determined on the basis of a simulation; this local workpiece temperature determined by means of a simulation can, for example, be determined individually for each workpiece using facility parameters;
- temperature distribution at the workpiece determined on the basis of a simulation; in particular, measured or determined facility parameters and/or workpiece parameters measured at specific points can be used for this; for example, by temperature measurement at specific points, a temperature distribution at the workpiece can be simulated by means of a simulation and used as workpiece parameter;
- information about the nature and/or type of the particular workpiece;
- information about physical and/or production-related workpiece characteristics;
- an individual workpiece identification number;
- information about a pre-treatment, pre-machining and/or manufacture of the particular workpiece preceding the treatment, in particular quality of the bare substrate;
- information about a post-treatment and/or further processing of the particular workpiece following the treatment.

Preferably, the workpiece parameters and/or the facility parameters and/or the facility parameters are included in the workpiece-specific data set as soon as they are available, in particular continuously during the entire process for manufacturing and finishing the workpiece or step by step after each of one or more treatment, processing and/or manufacturing steps.

All measured workpiece parameters as well as all facility parameters or treatment result parameters yet to be described can be measured, for example, contactlessly or by contact.

For example, to determine a temperature, a thermal contact element can be brought into contact with the workpiece or another object of which the temperature is to be determined. Preferably, however, the temperature is determined contactlessly.

In particular, one or more pyrometers are used for this purpose, which measure the temperature, in particular at specific points, linearly, i.e. with one-dimensional resolution, or areally, i.e. with two-dimensional resolution.

One or more pyrometers or also generally other sensors are movable in particular automatically relative to a workpiece, in particular continuously and/or in a clocked and/or motorised fashion and/or with use of or by a drive of a conveyor device for conveying the workpieces.

For example, a turntable can be provided on which one or more pyrometers or also generally other sensors are arranged and which, in order to be positioned differently, are movable, in particular rotatable, relative to a workpiece.

Alternatively or additionally to this, a plurality of pyrometers or other sensors can be provided, for example arranged evenly, in particular in a matrix. For example, a 2×2 or 3×3 or 4×4 matrix of 4, 9 or 16 pyrometers or other sensors can be provided to determine one or more workpiece parameters.

The measurement is carried out in particular on a surface that is processed and or treated identically for all workpieces. In particular, this surface is provided on an underside of the vehicle, which is not provided with a topcoat of a different colour for different vehicles. This makes it possible to optimise the comparability of the measurement results.

The underside is in particular a region in which merely a KTL surface (surface coated by cathodic dip painting) and/or primer surface (surface coated with primer) is visible.

Alternatively or additionally to this, however, a measurement can also be provided in the region of the differently coloured surfaces for different workpieces, for example due to other coloured organic polymer compounds.

All of the above statements regarding temperature measurement also apply to the measurement of reflection properties of a workpiece surface, absorption properties of a workpiece surface and/or other emission properties of the workpiece surface.

In particular, reflection measurements can be provided for measuring gloss and/or for DOI (Distinctness of Image) measurements.

In particular, reflection measurements and/or adsorption measurements can be provided for colour match measurements.

In particular, reflection measurements and/or adsorption measurements can be provided for structure scans of the surface.

One or more of the following parameters are preferably provided as facility parameters:
- a global measured temperature and/or a measured temporal and/or spatial temperature distribution in one or more treatment stations; in this case, in particular those local temperatures at locations along a movement path of the workpieces are used which prevailed, prevail and/or will prevail when the particular workpiece was arranged at the particular locations or when the particular workpiece is arranged or will be arranged at the particular locations; in this way, in particular the temperature in the particular treatment station which is specific for the particular workpiece can be detected;
- one or more operating parameters of one or more air-guiding devices of one or more treatment stations; for example, such air-guiding devices can be provided at painting stations and/or drying zones; the following parameters are provided as operating parameters, for example: current strength, voltage and/or frequency of a fan; volume flow and/or mass flow of the air guided in the air-guiding device; air temperature, air humidity, supply temperature of the air when supplied to a treatment chamber; discharge temperature of the air when discharged from the treatment chamber; pressure in the treatment chamber; performance data of a heating device, a cooling device, a dehumidifying device and/or a humidifying device;

one or more operating parameters of one or more conveyor devices of one or more treatment stations; here, in particular, a speed, stopping times, pauses and/or travel paths of individual or a plurality of conveying units of the conveyor device are taken into account, in particular of those one or more conveying units which will convey, are conveying or have conveyed the particular workpiece;

one or more operating parameters of one or more treatment units of one or more treatment stations; for example, when coating workpieces using spray coating (spray painting), there can be used as operating parameters a coating type, coating duration, flow rate, a temperature and/or a degree of contamination of a coating liquid and/or a maintenance status of one or more treatment units; for example, for immersion treatment there can be used as operating parameters a composition, a temperature, a total duration of use and/or a degree of contamination of an immersion liquid; for example, in the case of drying as treatment of one or more workpieces, preferably the operating parameters mentioned above as operating parameters of a ventilation device are used as operating parameters of one or more treatment units;

one or more operating parameters of one or more filter facilities and/or cleaning facilities for removing contaminants from an airflow and/or a treatment medium for workpiece treatment; in particular, data regarding the maintenance status of the filter facility and/or cleaning facilities are provided as such operating parameters.

The following can be cited as specific examples:

As an operating parameter for an air-guiding device, in particular of one or more fans, a flow monitoring and/or a differential pressure measurement can be used, for example, which detects a pressure jump between the inlet side and outlet side of the fan. If the sensor provided for this purpose instead detects the pressure drop across the nozzles and/or at another point, in particular in a recirculation circuit, the nozzle exit speed can preferably be determined from this (in particular with the aid of a correction factor). The function of monitoring the fan can still preferably be fulfilled after changing the sensor position. Preferably, no further sensors are required for measuring the nozzle exit speed.

Furthermore, it may be provided to infer the nozzle exit speed from the fan frequency. For this purpose, an ageing of filters of a filter facility, in particular a pressure loss across the filters, is preferably taken into account.

The workpiece parameters and/or facility parameters can in particular be used directly to assess a quality of the workpiece.

Preferably, however, an evaluation is carried out.

In particular, for the creation of the workpiece-specific data sets, correlation data are preferably used which establish a correlation between a) the one or more workpiece parameters and/or the one or more facility parameters and b) one or more treatment result parameters.

For example, using the measured or simulated temperatures and/or temperature distributions, a degree of curing of a coating and thus an essential parameter of the treatment result to be achieved can be concluded.

Preferably, simulation data and/or simulation functions are used as correlation data or for determining the correlation data. By means of the simulation data and/or simulation functions, one or more treatment parameters and/or one or more treatment result parameters are preferably calculated on the basis of the one or more workpiece parameters and/or the one or more facility parameters.

A simulation model used as correlation data or to produce correlation data is preferably calibrated by one or more test runs of a workpiece which is provided with sensors and/or which is monitored. In particular, such a calibration is performed regularly, for example weekly, fortnightly or every four weeks, in particular to ensure the reliability of the correlation data continuously.

According to the method described above, workpiece parameters and/or facility parameters can find their way into the workpiece-specific data set as measured values or can be processed or otherwise used using one or more simulations or other correlation data, wherein the resulting parameters, in particular workpiece parameters and/or facility parameters, preferably find their way into the workpiece-specific data set. All workpiece parameters and/or facility parameters preferably enable a statement or a conclusion to be drawn about the quality of the workpiece.

However, only the treatment result parameters preferably reflect exactly those values that directly reflect the treatment result and, in particular, do not require any further interpretation or inferences.

The one or more treatment result parameters can preferably be checked, in particular verified, by an immediate measurement, in particular during and/or immediately after the treatment process, for example a surface finishing process.

In particular, a contactless measurement of the surface structure and/or the course and/or the degree of gloss of a refined material surface of the workpiece can be carried out to determine one or more treatment result parameters.

The use of correlation data, in particular using simulation data and/or simulation functions, preferably enables a drastic reduction in the measurement technology that would be required to obtain the same amount of data, in particular the same treatment result parameters, by direct measurement on each individual workpiece. In particular, a high-resolution, three-dimensional monitoring and/or examination of the workpiece can be made possible using only individual measured values.

In particular for the verification of the correlation data but also for the further increase of the checking quality, it is preferably provided that one or more sensory treatment result parameters are determined by means of one or more sensors during and/or after the performance of the treatment.

The one or more sensory treatment result parameters are preferably compared with one or more predefined and/or simulated treatment result parameters, wherein in particular a quality parameter is obtained which preferably reflects whether the treatment of the particular workpiece fulfils one or more quality criteria.

Alternatively or additionally, the quality parameter can provide information about the quality of the simulation. For example, the quality parameter is used for validation and/or verification and/or fine-tuning of the simulation, in particular simulation parameters of the simulation.

A sensory treatment result parameter is preferably obtained by direct contactless or contact-based measurement on the workpiece concerned.

Predefined treatment parameters are in particular those that are predefined as desired properties of a workpiece.

Simulated treatment result parameters are preferably those which are obtained based on one or more workpiece parameters and/or one or more facility parameters, in particular using correlation data.

Furthermore, predefined treatment result parameters are preferably parameters measured on a reference workpiece.

Preferably, one or more of the following parameters are provided as treatment result parameters:
- thickness of a coating, in particular the thickness of each of one or more coatings, for example a primer, a topcoat and/or a clear coat;
- quality of a coating and/or a substrate surface, in particular evenness and/or roughness of a coating, in particular of each layer or individual layers;
- uniformity of a thickness of a coating, in particular uniformity of each layer or individual layers;
- hue and/or brightness and/or colour match and/or gradient and/or gloss level of a coating, in particular before and/or after the application of a clear coat;
- surface structure and/or gradient and/or gloss level of an individual layer or for the final clear coat layer;
- hardness of a coating, in particular after curing of the topcoat and/or clear coat;
- chemical composition of a coating, in particular degree of cross-linking and/or solvent content;
- degree of contamination of a coating;
- spatial distribution and/or temporal course of the temperature of the workpiece during and/or after the performance of a treatment, in particular after a drying process;
- position of local temperature maxima and/or temperature minima generated by the treatment on the workpiece;
- information about measured, simulated and/or expected defects or other quality deficiencies on the particular workpiece, in particular position and/or extent of coating faults.

It can be favourable if the workpiece-specific data sets are supplemented by:
- one or more workpiece-specific sensory treatment result parameters;
- one or more workpiece-specific predefined treatment result parameters;
- one or more workpiece-specific simulated treatment result parameters;
- one or more quality parameters.

A quality parameter is in particular a value which, for example, allows a statement about a quality criterion of the workpiece without further setpoint value comparison or other evaluation.

For example, a quality parameter is a parameter that can take the value 1 or 0, which ultimately can mean "OK" or "free of defects" or "not OK"/"defective". A quality parameter can be, for example, "correct layer thickness", "correct hue", "temperature limits compliance", etc.

It can be favourable if the data sets of a plurality of workpieces are compared with each other, correlated and/or combined, wherein preferably a process data set is obtained, which in particular reflects a temporal development of one or more facility parameters, one or more workpiece parameters and/or one or more treatment result parameters.

The process data set is preferably evaluated, in particular by means of a data mining process and/or by means of a deep learning process. Preferably, this allows conclusions to be drawn about possible sources and/or causes of determined and/or expected quality deficiencies in the workpieces.

Depending on one or more workpiece-specific data sets and/or depending on a process data set obtained from a plurality of workpiece-specific data sets, a treatment facility for treating the workpieces, in particular one or more treatment stations of the treatment facility, is preferably controlled with regard to one or more facility parameters.

For example, it can be provided that a conveyor device is controlled depending on one or more workpiece-specific data sets and/or depending on a process data set obtained from a plurality of workpiece-specific data sets, in particular to vary and/or select a conveyor path along which a particular workpiece is conveyed, in particular to treat said workpiece.

It can be advantageous if the workpieces are supplied to one or more post-treatment stations after one or more treatment steps, in particular one or more painting processes, have been performed in one or more treatment stations, depending on the content of the particular workpiece-specific data set.

The post-treatment stations are preferably automatic treatment stations. In particular, the workpieces can be automatically reworked at those defects or regions having other quality deficiencies that are stored as such in the relevant workpiece-specific data set.

In particular, an automatic treatment station and/or an automatic reworking eliminates, in particular, the need for manual intervention by an operator.

Alternatively, however, it can also be provided that one or more post-treatment stations are configured as manual treatment stations and that the post-treatment is carried out manually by one or more workers. A combination of automatic and manual treatment, in particular post-treatment, can also be provided.

It can be advantageous if the workpiece-specific data sets of the workpieces are modified and/or supplemented during and/or after the post-treatment, in particular by workpiece parameters which relate to the performance of the post-treatment and/or by facility parameters which relate to one or more post-treatment stations and/or by treatment result parameters which are treatment-specific and/or workpiece-specific and arise as a result of the post-treatment.

In one of examples disclosed herein, it can be provided that, after one or more post-treatment steps have been carried out, the workpieces are supplied to one or more further post-treatment stations, in particular for renewed post-treatment, depending on the modified and/or supplemented content of the particular workpiece-specific data set.

Alternatively or additionally to this, it can be provided that the workpieces are marked as rejects and disposed of after one or more post-treatment steps have been carried out, depending on the modified and/or supplemented content of the particular workpiece-specific data set.

The described method can be carried out in particular by means of a checking facility for checking workpieces.

The present disclosure therefore also relates to a checking facility for checking workpieces, in particular vehicle bodies and attachment parts.

The checking facility preferably comprises the following:
- one or more checking stations for determining one or more workpiece parameters of the workpieces to be checked and/or one or more facility parameters of a treatment facility for treating the workpieces to be checked;
- a control device which is set up and configured in such a way that a workpiece-specific data set can be created for each workpiece by means of the control device based on the one or more workpiece parameters and/or based on the one or more facility parameters, in particular in accordance with a method according to examples disclosed herein.

The checking facility preferably has one or more of the features and/or advantages described in conjunction with the method.

The checking facility is particularly suitable for use as a component of a treatment facility for treating workpieces, in particular vehicle bodies.

The present disclosure therefore also relates to a treatment facility for treating workpieces, which preferably comprises the following:
  one or more treatment stations for treating the workpieces;
  a checking facility for checking workpieces, in particular a checking facility according to examples disclosed herein;
  a conveyor device by means of which workpieces can be conveyed to one or more checking stations of the checking facility, through the one or more checking stations and/or away from the one or more checking stations and/or by means of which workpieces can be conveyed to one or more treatment stations, through one or more treatment stations and/or away from the one or more treatment stations.

The treatment facility according to examples disclosed herein preferably has one or more of the features and/or advantages described in conjunction with the method according to examples disclosed herein and/or the checking facility according to examples disclosed herein.

The control device of the checking facility is preferably arranged in such a way that all described method steps can be performed. Preferably, all components of the checking facility and/or the treatment facility are set up and configured in such a way that they can be controlled by means of the control device in order to perform one or more of the described method steps.

Furthermore, the method, the checking facility and/or the treatment facility may have one or more of the following features and/or advantages:

One or more checking stations of the checking facility can, for example, each have one or more permanently installed checking units. Alternatively or additionally to this, one or more mobile and/or portable checking units can be provided, which can be arranged selectively at different checking stations of the checking facility.

One or more checking stations are then in particular receiving devices for one or more checking units, which can be arranged at the particular checking station as required and/or for set-up purposes and/or optimisation purposes.

One or more workpiece parameters and/or one or more facility parameters preferably serve as the basis for parameterisation of a software tool, which in particular forms or comprises a physically based, algorithm-supported simulation model.

In particular, recorded data from measurement runs are used for the parameterisation and/or calibration of the simulation model in order to extract simulation parameters, preferably in automated manner. These data are recorded, for example, on a mobile basis, in particular by means of sensors on a workpiece and/or by means of sensors directed at the workpiece.

It can be favourable if one or more measurement runs are performed, in which the facility parameters and/or the workpiece parameters lie within a predefined range of values, which leads to a defect-free workpiece.

Alternatively additionally to this, it can be provided that one or more measurement runs are performed with facility parameters that represent a disturbed facility operation. This can be used in particular to draw conclusions about potential fault sources that may occur during subsequent production operation.

In particular, the simulation model forms correlation data or a component thereof.

The correlation data preferably allow the calculation of heating curves at different workpiece measurement points for different workpiece types, in particular different car body measurement points for different car body types, preferably furthermore depending on different facility states and thus different facility parameters. The workpiece parameters and/or facility parameters obtained in this way can preferably be stored, in particular in one or more workpiece-specific data sets and/or a process data set.

Preferably, an assessment and validation of the quality of the simulation and/or the correlation data is possible by a reference measurement of a surface temperature at a specified point of each workpiece, in particular by stationary or mobile measurement by means of a stationary or mobile sensor configured as a pyrometer.

Preferably, one or more measurement points are provided for this purpose at or in one or more treatment stations in order to obtain a valid reference measurement value for each workpiece, in particular at critical points during a treatment. This reference measurement value can then be used in particular as a workpiece parameter for determining one or more treatment result parameters.

For example, a measurement of a workpiece parameter, in particular a reference temperature on a surface of the workpiece, can be performed, for example in a treatment station formed as a dryer, at a point in time and/or at a point when high gradients are expected in a heating curve. Any deviations from a predefined and/or simulated heating behaviour can then preferably be reliably detected and/or determined.

For example, if an asymmetrical heating of the workpiece results from a temperature determination, in particular a temperature distribution determination, one or more of the following measures for compensation, for example, can be taken automatically, in particular initiated automatically by means of the control device:
  alteration of inlet nozzles, in particular adjustment of a range and/or orientation in such a way that overheated regions are exposed to inflowing heated air to a lesser extent and/or undercooled regions are exposed to inflowing heated air to a greater extent;
  adjustment of different volume flows for different inlet nozzles, in particular by adjusting associated valves and/or throttle valves, for example to compensate for asymmetries caused by process-related non-uniformities (e.g. at the transition from pre-dryer to main dryer, transition from holding to cooling, etc.) during the preceding heating;
  asymmetrical arrangement and/or orientation of the workpieces in the cycle, i.e. the workpiece is stopped a little too early or too late relative to one or more inlet nozzles, for example, and is thus exposed to a greater extent on one side.

In addition to the opportunity of predicting temperature curves, examples disclosed herein preferably also result in the possibility of assessing the quality of the heating process of each workpiece and, if necessary, correcting and thus actively intervening in the control of the process in order, for example, to achieve quality-relevant temperatures or to be able to implement an emergency strategy in the event of a facility malfunction.

Examples disclosed herein makes it possible, for example, to establish correlations between results of an automatic fault check after the process has been run through and the heating curves that the workpiece has experienced. For each car body examined during a fault check, there is preferably a clearly assigned calculated heating curve, which in particular forms part of the workpiece-specific data set.

The facility parameters can preferably be optimised using correlation data, in particular an evaluation logic, towards those process parameters or facility parameters that have provided the best results in the fault check. In this way, the effects of different facility settings made by the operator on the quality results can preferably be recorded and the system can be optimised towards optimum settings, for example as follows:

influence of the curing time on the yellowing of light-coloured paints, in particular light-coloured UNI paints and/or clear coats;

influence of the heating gradients/temperature gradients of the workpieces on the distribution and cross-linking of the clear coat and thus on the topcoat level, the formation of the clear coat (for example with regard to the appearance, which can be assessed, for example, with long wave and short wave measurements or mathematical derivations thereof).

Preferably, an initialisation of the simulation model, which in particular is a component of the correlation data or forms the latter, is carried out for each workpiece type during the commissioning of the dryer, for example by measuring the heating curves. It can be provided that the initialisation runs are carried out with facility parameters that represent both normal operation and a possible disturbed operation.

The initialisation runs can be used in particular to apply a test signal to the system in the form of a temperature step function and to be able to describe the temperature dynamics in the zone and thus the system behaviour with the help of the measured step response for different process parameters.

Comparable initialisations can be provided for facility parameters other than temperature.

The results of subsequent measurement runs to validate the treatment process preferably ensure, fully automatically, recurring calibration of the correlation data.

It can be favourable if the transmission of the values during these measurement runs is done wirelessly, for example by telemetry, in particular automatically, and if preferably no manual data transmission is required. In this way, possible operating faults can preferably be avoided and, furthermore, a correct temporal synchronisation of measurement data and setpoint values can preferably be ensured.

It can be advantageous if an interface for an operator, in particular a process visualisation and/or an operating panel, is provided, which, for example, enables an initialisation run and/or a measurement run and/or a calibration run to be started and monitored.

In a further optional embodiment of examples disclosed herein, it can be provided that, alternatively or additionally to a heating curve as a workpiece parameter, a flow speed is determined, in particular at different points of each individual workpiece. This can be done by directly measuring the flow speed on a reference workpiece and creating a model or indirectly by calculating it from other workpiece parameters and/or facility parameters, for example from the heating behaviour.

The determination of the flow speed is preferably carried out analogously to the determination of temperature curves described above. Sensors for determining velocities, preferably anemometers, are used at various measurement points on a measurement workpiece. The temporal courses of the velocities can be recorded with the aid of a mobile data logger. From the assignment of the recorded measurement data to the facility parameters (temperatures, fan frequencies, volume flows and pressures), a model can be obtained that enables the calculation of real-time speed curves at individual points of production workpieces that are not equipped with any sensors. There may be a causal relationship between appearance, i.e. the quality of the painted surface. Low flow speeds can be advantageous in this respect.

Alternatively or in addition to the use of a measurement workpiece with speed sensors, the speed at individual measurement points can also be calculated from the temperature curve, i.e. the heating kinetics and known or measured workpiece properties (for example thickness, heat capacity, etc.), for example using a model for heat transfer. For this purpose, the different incident-flow ratios from the front and rear side and/or in an interior space of the workpieces are preferably taken into account. The distribution of the heat input over the front and rear side and/or in the interior can be implemented, for example, on the basis of simulation results and characteristic dryer features.

The flow speed can have a significant influence on results obtained at an automatic checking station and/or a quality inspection station after the drying process. Optimisation of the facility parameters based on the quality determined in the checking station and/or a quality inspection station can therefore be advantageous.

It can be favourable if the facility parameters are varied within a predefined fluctuation range around a predefined setpoint value and are automatically optimised to those values that deliver the best quality results.

Examples disclosed herein are preferably usable and transferable for and to all throughput processes in production methods in which the quality-relevant measurement variables can be defined.

Examples of this are the pre-treatment and cathodic dip painting, where the bath temperature or the flow strength have an influence on the quality of the body coating or layer thickness distribution.

The treatment result parameters, which are obtained in particular by using correlation data and/or using workpiece parameters and/or facility parameters, preferably provide conclusions or information about the following:

substrate quality of the material for manufacturing the workpiece, in particular a body-in-white sheet metal;

drying conditions for each individual workpiece;

quality of the treatment result, in particular one or more coating results;

hardening of the material and/or materials, in particular steel and/or aluminium;

total time spent in a particular treatment station, for example in the dryer;

accumulated process time above a certain baking temperature;

maximum temperature difference that occurs during the course of a drying process between the individual measurement points in the individual drying portions (e.g. pre-dryer, main dryer and cooling zone);

maximum temperature gradient [K/min] that occurs during the drying process at the individual measurement points in the individual drying portions (e.g. pre-dryer, main dryer and cooling zone).

The object underlying examples disclosed herein is further solved by a method for checking workpieces, wherein the method comprises the following steps as an alternative or additionally to one or more of the other method features described:

Determining one or more workpiece parameters of the workpieces to be checked by means of an automatic checking station; categorising the workpieces depending on at least one of the workpiece parameters determined by means of the checking station.

Alternatively or additionally to an automatic checking station, a manual checking station can be provided.

An automatic checking station is in particular a checking station in which the checking of the workpieces is preferably carried out exclusively by machine.

A manual checking station is in particular a checking station in which the checking of the workpieces is carried out by one or more persons, if necessary with machine assistance.

Furthermore, a plurality of checking stations, in particular a plurality of automatic checking stations and/or a plurality of manual checking stations, can be provided in the method.

The plurality of checking stations can in particular be functionally identical, so that in particular the same workpiece parameters can be determined by means of these checking stations.

Alternatively or additionally, a plurality of checking stations can be provided which are functionally different from each other, so that the different checking stations serve to determine different workpiece parameters.

It can be favourable if workpieces are post-treated, in which case, by means of the checking station, one or more workpiece parameters have been determined which are to be classified as defective or which result in a defect on the workpiece.

For example, it can be provided that a layer thickness of a coating, which represents a workpiece parameter, for example, is determined to be too low. This can be classified as a defect of the workpiece. In particular, if this defect only occurs locally, this defect can preferably be remedied by a post-treatment.

Such a workpiece can then be post-treated in particular to ultimately achieve a defect-free workpiece.

Furthermore, it can be provided that workpieces are not subjected to any post-treatment if all workpiece parameters determined by means of the checking station can be classified as free of defects and do not result in any defects on the workpiece.

The workpieces can thus be categorised in particular automatically into several categories. In particular, a "defect-free" category and a "correctable defect" category can be provided. The workpieces in the "defect-free" category are preferably not subjected to any post-treatment. The workpieces in the "correctable defect" category can preferably be further categorised, wherein a distinction can be made in particular between an "automatically correctable defect" category and "manually correctable defect" category. Depending on this categorisation, the correspondingly categorised workpieces are preferably supplied to an automatic post-treatment station or a manual reworking station and are automatically post-treated or manually post-treated therein.

Furthermore, depending on the determined one or more workpiece parameters, a categorisation of workpieces into an "irreparable defect" category can be provided. This category includes, in particular, workpieces that cannot be restored to a defect-free state by a post-treatment. In particular, such workpieces are to be disposed of as rejects.

The workpieces are preferably supplied to different stations by means of a conveyor device depending on a result of the categorisation. For example, the workpieces of the "defect-free" category are supplied to a quality inspection station and/or lastly to a storage station, for example a high-bay storage installation.

The workpieces of the "automatically correctable defect" category are automatically supplied from the checking station to an automatic post-treatment station by means of the conveyor device. After the automatic post-treatment, the workpieces are again supplied in particular to a checking station or are further post-treated in a manual post-treatment station. The workpieces of the "manually correctable defect" category are automatically supplied to a manual post-treatment station after the checking station by means of the conveyor device. Afterwards, these workpieces are again supplied to a checking station.

The workpieces in the "irreparable defect" category are supplied in particular to a disposal station.

One or more workpieces are preferably supplied to a quality inspection station following the checking station.

In particular, a quality inspection of the workpieces is carried out in a quality inspection station.

In particular, the workpieces are examined during the quality inspection for the result of a treatment process.

Preferably, only those workpieces are subjected to a quality inspection which have been categorised as defect-free by means of a checking station.

The workpieces supplied to the quality inspection station are preferably a selection from all manufactured and/or treated workpieces. Preferably, only these workpieces are subjected to a quality inspection.

In particular, it can be provided that statistically distributed individual workpieces, for example every second or every third workpiece, are selected for supplying to the quality station and are subjected to a quality inspection there.

Furthermore, it can be provided that those workpieces are supplied to the quality inspection station and subjected to a quality inspection which have been treated after a change of facility parameters, for example after a colour change during painting, and which have preferably been categorised as defect-free by the checking station.

Furthermore, it can be provided that all manufactured and/or treated workpieces are supplied to the quality inspection station and subjected to a quality inspection.

Preferably, not every one of the manufactured and/or treated workpieces is supplied to the quality inspection. Rather, a special selection is preferably made from these workpieces.

The selection of the workpieces to be supplied to the quality inspection station is preferably based on measured and/or calculated and/or simulated workpiece parameters and/or based on measured and/or calculated and/or simulated treatment result parameters, which in particular comprise or are based on one or more of the following parameters:

hue and/or brightness and/or colour match and/or gradient and/or gloss level of a coating;

quality of a coating and/or a substrate surface, in particular evenness and/or roughness of a coating, in particular of each layer or individual layers;

surface structure and/or gradient and/or gloss level of an individual layer or for the final clear coat layer;

uniformity of a layer thickness of a coating;

thickness of a coating;

hardness of a coating;

chemical composition of a coating, in particular degree of cross-linking and/or solvent content;

information about the nature and/or type of the particular workpiece;

information about physical and/or production-related workpiece characteristics;

an individual workpiece identification number;

information about the manufacture and/or processing of the particular workpiece, in particular the quality of the body-in-white substrate, prior to the treatment;

information about a post-treatment and/or further treatment of the particular workpiece, subsequent to the treatment;

information about measured, simulated and/or expected defects or other quality deficiencies on the particular workpiece, in particular position and/or extent of coating faults.

During the quality inspection, one or more of the following parameters are preferably measured, in particular automatically or manually:

hue and/or brightness and/or colour match and/or gradient and/or gloss level of a coating;

quality of a coating and/or a substrate surface, in particular evenness and/or roughness of a coating, in particular of each layer or individual layers;

surface structure and/or gradient and/or gloss level of an individual layer or for the final clear coat layer;

uniformity of a layer thickness of a coating;

thickness of a coating;

hardness of a coating;

chemical composition of a coating, in particular degree of cross-linking and/or solvent content;

degree of contamination of a coating;

reflection properties of a workpiece surface;

absorption properties of a workpiece surface;

emission properties of a workpiece surface.

It can be advantageous if, during the quality inspection, quality measurements are only carried out at those points of the workpieces which are free of defects according to a result of the check in the checking station.

Results of the quality inspection are preferably used to adjust one or more facility parameters, in particular in one or more treatment stations for treating the workpieces, in particular regardless of whether or not the quality measurement has determined a defect on one or more workpieces.

For example, a temperature profile in a treatment station formed as a dryer can be adjusted if a colour deviation resulting from local overheating has been determined during the course of the quality inspection, in particular quality measurements. Even if the determined colour deviation is within predefined tolerances, the adjustment of the temperature profile can be advantageous, in particular in order to minimise the number of potentially problematic defects.

It can therefore be advantageous if, based on the results of the quality inspection, an adjustment of one or more facility parameters, in particular in one or more treatment stations for treating the workpieces, is carried out even if the one or more facility parameters lie within predefined limit values, wherein in particular drifts in a temporal development of the one or more facility parameters are already mitigated or compensated.

Preferably, the adjustment of one or more facility parameters is carried out automatically, in particular without user intervention. However, it can also be provided that the adjustment of one or more facility parameters is suggested to a user or operator of the facility by means of a control device and is only carried out when the user approves the suggestion.

The method according to examples disclosed herein is particularly suitable for being carried out in a checking facility.

The checking facility preferably has the following as an alternative or additionally to the checking facility already described:

one or more checking stations for automatically determining one or more workpiece parameters of the workpieces to be checked;

a control device which is set up and configured in such a way that the workpieces can be categorised by means of the control device depending on at least one of the workpiece parameters determined by means of the one or more checking stations.

By means of the control device, the checking facility can be controlled in particular in such a way that the described method can be performed.

The checking facility preferably has one or more of the features and/or advantages described in conjunction with the method.

The one or more checking stations preferably each comprise one or more checking units.

One or more checking units can, for example, be formed as a robot or comprise a robot.

The one or more checking units may also, at the same time, form or be part of one or more treatment units.

In particular, a robot can form both a treatment unit and a checking unit and can serve simultaneously or alternately for the treatment as well as the checking of workpieces.

A checking unit can, for example, comprise one or more sensors, which are also referred to here as checking sensors.

A checking sensor is, for example, a camera, an area sensor, a line sensor and/or a point sensor, wherein in each case a detection of visible light, UV radiation and/or infrared radiation, for example thermal radiation, is provided.

A checking sensor, but also any other sensor, can for example be protected against heating and/or damage and/or contamination. For this purpose, for example, an air purge or other purge can be provided in a housing of the checking sensor or else in an environment thereof. In the case of compressed air purging in particular, for example, a compressed air line can be routed in a common media duct or cable duct together with a data line and/or power line for supplying the particular checking sensor.

Preferably, a plurality of such checking sensors are provided.

In one embodiment of examples disclosed herein, it can be provided that one or more checking stations are formed as a gantry through which the workpieces can be conveyed in order to be checked.

In particular, one or more workpieces can be conveyed by means of a conveyor device through one or more checking stations formed as a gantry.

Alternatively, one or more checking stations can be formed as a gantry that can be moved over the workpieces to check them.

The checking unit is particularly suitable for use in a treatment facility.

Examples disclosed herein therefore also relate to a treatment facility which has, for example, one or more of the features and/or advantages of a treatment facility described above.

The treatment facility further preferably comprises the following:
- one or more treatment stations for treating the workpieces;
- a checking facility for checking workpieces, in particular a checking facility according to examples disclosed herein;
- a conveyor device by means of which workpieces can be conveyed to one or more checking stations of the checking facility, through the one or more checking stations and/or away from the one or more checking stations and/or by means of which workpieces can be conveyed to one or more treatment stations, through one or more treatment stations and/or away from the one or more treatment stations.

It can be favourable if one or more checking stations are integrated in a treatment station and/or in a post-treatment station of the treatment facility. By means of one or more treatment units of the treatment station and/or the post-treatment station, which preferably each have one or more checking units, a checking of the particular workpiece can preferably be performed.

In order to assess the quality of a workpiece surface finished, for example, with paint materials as quickly as possible, in particular after completion of the workpiece in a treatment facility and/or after checking of the workpiece in a checking zone or checking station, so that the least possible time and/or financial losses and/or wastage occur, it is proposed to use an automatic checking station to measure qualitative workpiece parameters after the treatment (in particular surface finishing), to eliminate, and to store the results from facility parameters and/or workpiece parameters within the entire production chain as a specific life record for the workpiece.

Further preferred features and/or advantages of examples disclosed herein are the subject of the following description and the illustration in the drawings of embodiment examples.

BRIEF DESCRIPTION OF THE DRAWINGS

Like or functionally like elements are denoted by the same reference signs in all figures.

DETAILED DESCRIPTION OF THE DRAWINGS

An embodiment of a treatment facility denoted as a whole by 100 shown in FIGS. 1 to 8 is used, for example, to treat workpieces 102, in particular vehicle bodies 104.

The treatment facility 100 is used in particular for coating workpieces 102 and as such comprises, for example, a plurality of treatment stations 106.

Figure 1:
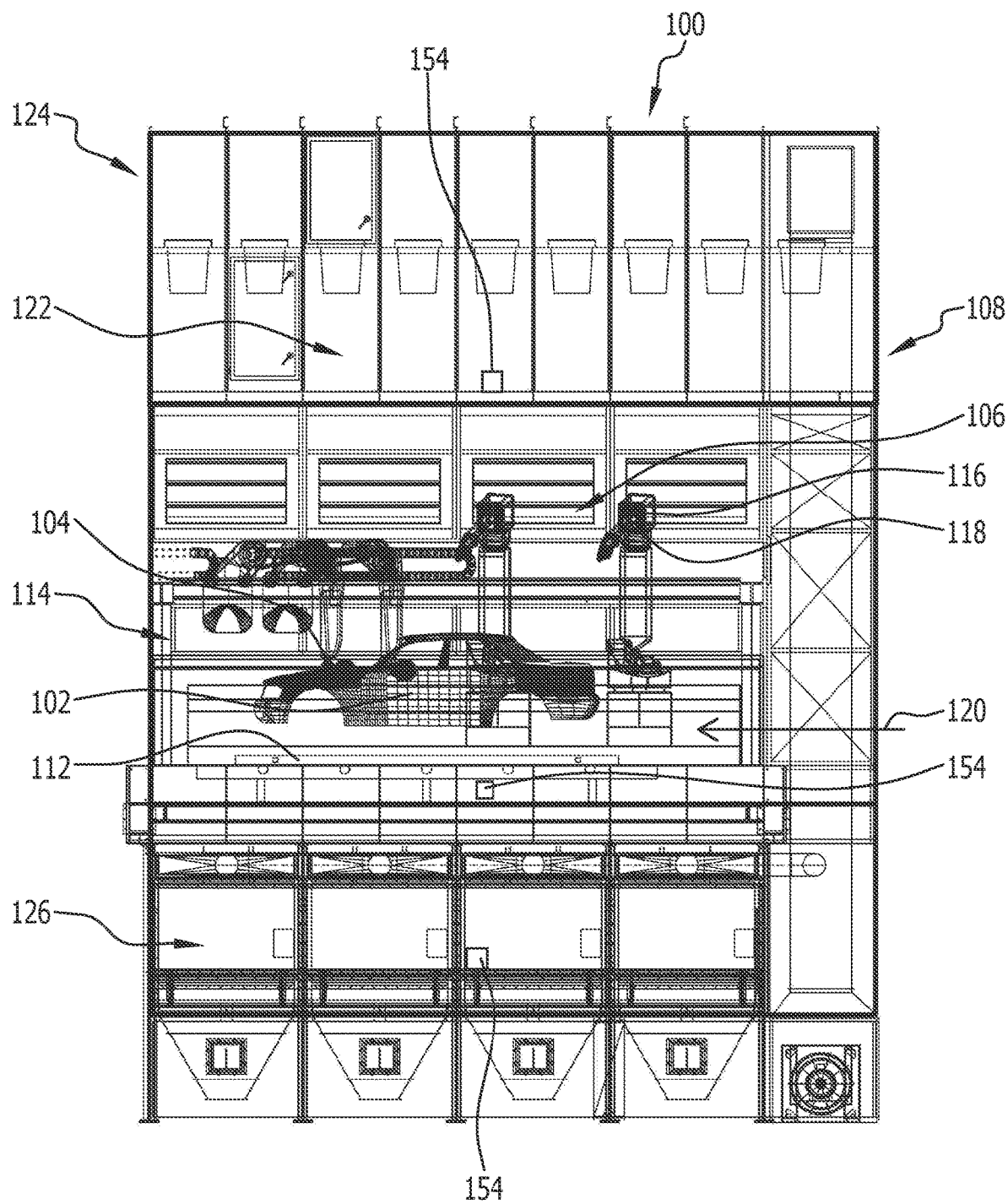
FIG. 1 a schematic vertical longitudinal section through a treatment station of a treatment facility for treating workpieces, which treatment station is formed as a painting facility.
Figure 2:
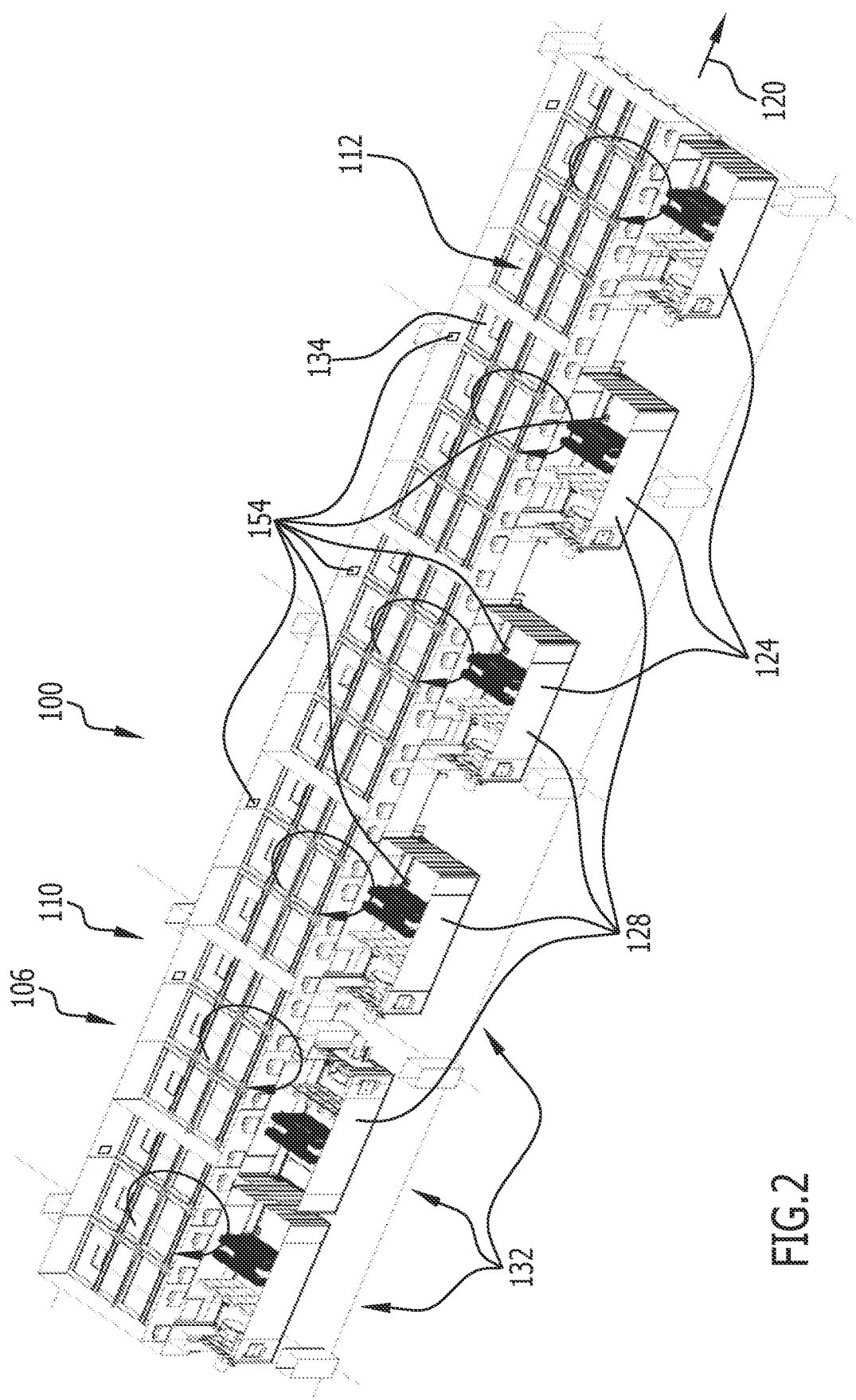
FIG. 2 a schematic perspective sectional view of a treatment station of the treatment facility formed as a dryer.

In particular, one or more treatment stations 106 in the form of a painting facility 108 are provided, to which in particular one or more treatment units 106 in the form of a dryer 110 are connected (see FIGS. 1 and 2).

In particular, the treatment facility 100 comprises a conveyor device 112 by means of which the workpieces 102 can be conveyed through the treatment facility 100. In particular, the workpieces 102 can be conveyed from one treatment station 106 to the next treatment station 106 by means of the conveyor device 112.

The treatment station 106, which is formed as a painting facility 108, comprises in particular a painting chamber 114 in which one or more treatment units 116, for example painting robots 118, are arranged.

In particular, the workpieces 102 can be conveyed through the painting chamber 114 in a conveying direction 120.

In particular, a plenum 122 of an air-guiding device 124 for supplying air to the painting chamber 114 is arranged above the painting chamber 114.

A filter facility 126 is preferably arranged below the painting chamber 114 for cleaning the air discharged from the painting chamber 114.

Figure 3:
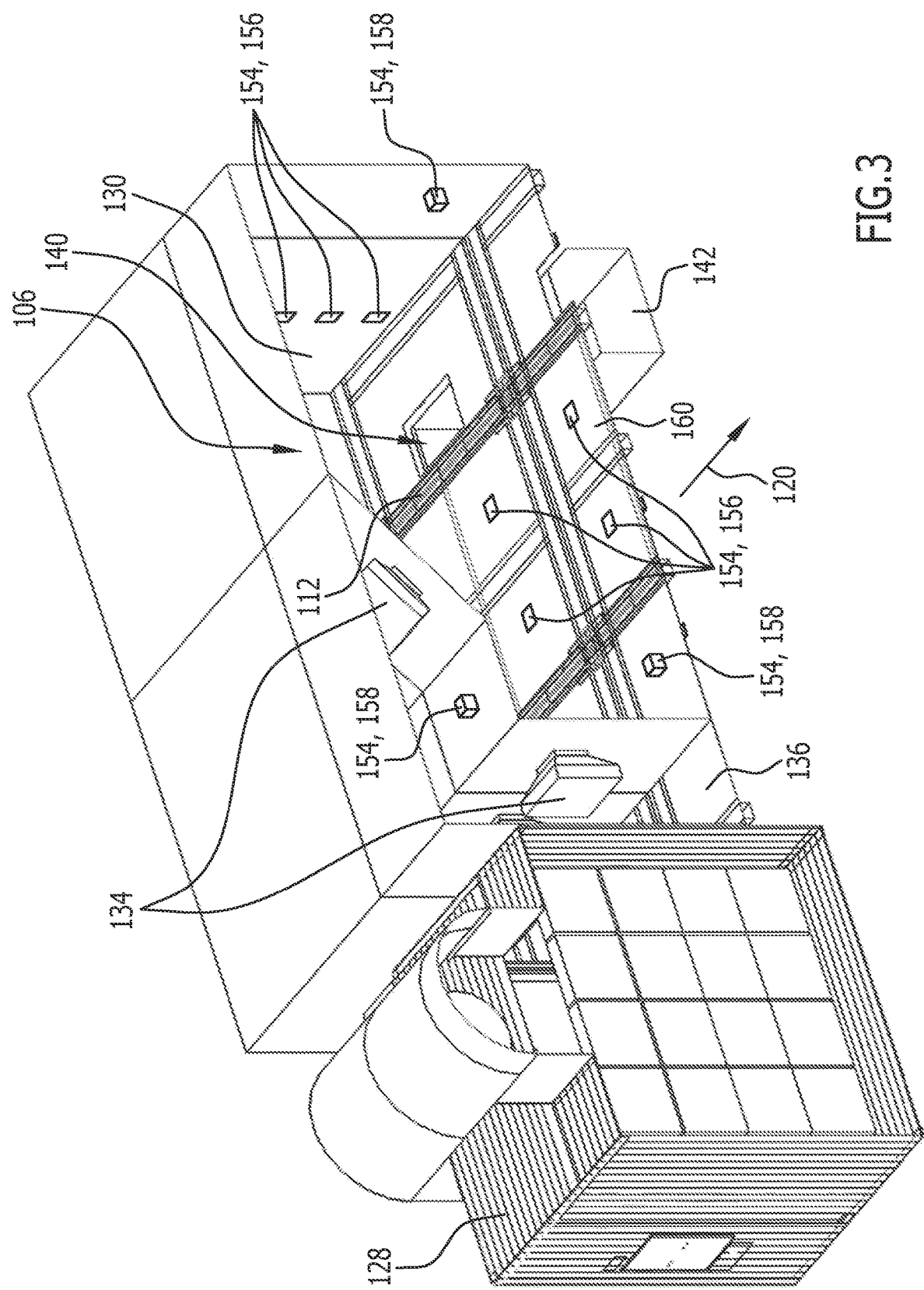
FIG. 3 a schematic perspective sectional view of a dryer module of the dryer from FIG. 2.

As can be seen in particular from FIGS. 2 and 3, the treatment station 106 formed as a dryer 110 comprises in particular a plurality of air-guiding devices 124, each of which is constructed, for example, as a recirculation module 128 and which, together with in each case a drying chamber portion 130, form a plurality of dryer modules 132 of the dryer 110.

The drying chamber portions 130 together form a drying chamber 134 of the dryer 110.

The workpieces 102 can be conveyed through the drying chamber 134 in the conveying direction 120 by means of the conveyor device 112.

Each recirculation module 128 of the dryer 110 is preferably connected to its associated drying chamber portion 130 via a distribution chamber 136 of the air-guiding device 124 of the dryer 110.

Via the distribution chamber 136, the air conditioned in the recirculation module 128 can be distributed, in particular evenly distributed, and supplied to one or more supply devices 138, for example inlet nozzles.

Supply air is introduced into the drying chamber portion 130 via the supply device 138.

Exhaust air is discharged from the particular drying chamber portion 130 via one or more discharge openings 140 and collected, for example, via a discharge duct 142, and/or returned to the recirculation module 128 for reconditioning.

Figure 4:
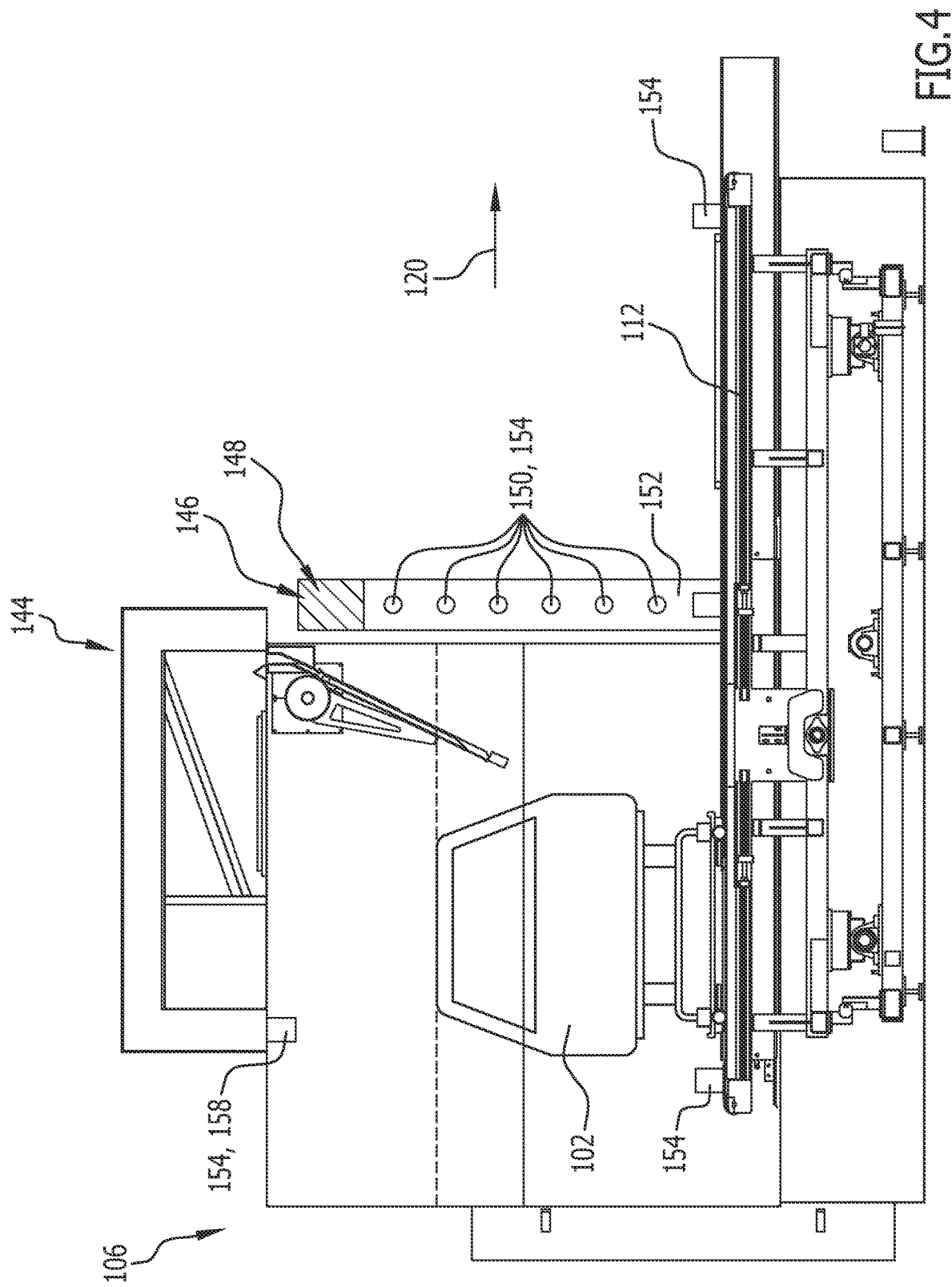
FIG. 4 a schematic vertical longitudinal section through an outlet lock of a treatment station of the treatment facility.

As can be seen in particular from FIG. 4, an outlet lock 144 is preferably arranged at one end of a treatment station 106. By means of such an outlet lock 144, in particular, an atmosphere prevailing in the treatment station 106 can be optimised by minimising disturbances resulting from the removal of the workpieces 102 from the particular treatment chamber.

Once the workpieces 102 have been painted in the painting facility 108 and dried in the dryer 110, they are supplied to a manual checking station (not shown) after the dryer 110, for example. At this checking station, for example, appropriately trained personnel examine whether the workpiece 102 meets the required quality criteria. For example, it is examined whether an applied paint has a predefined colour and is free of contaminants and other paint faults.

If a fault is detected, it can be corrected manually by polishing, for example.

However, it may be advantageous if the fault check and/or a post-treatment of the workpieces 102 is carried out automatically.

As can be seen in particular from FIG. 4, the treatment facility 100 preferably comprises a checking station 146 for this purpose, which is in particular an automatic checking station 146.

The checking station 146 can, for example, take the form of a gantry 148 through which the workpiece 102 can be conveyed in order to be checked.

Alternatively, the checking station 146 may be arranged in a separate checking room or checking area, to which the workpieces 102 can be conveyed by means of the conveyor device 112.

In each feasible embodiment, the checking station 146 preferably comprises one or more checking units 150, which are arranged in particular on one or more receiving devices 152.

The checking units 150 can each be permanently arranged on the corresponding receiving device 152. Alternatively or additionally to this, one or more checking units 150 can be mobile and/or portable and can be merely temporarily arranged on corresponding receiving devices 152.

A checking unit 150 is or comprises in particular one or more sensors 154.

The treatment facility 100 also comprises sensors 154 operating independently of the checking station 146 and/or in coordination with the checking station 146.

All sensors 154 are preferably used to detect workpiece parameters and/or facility parameters.

Workpiece parameters are those parameters that relate to the workpiece 102 to be treated.

For example, sensors 154 that measure temperature, such as a pyrometer 156 (see FIG. 5), can detect a workpiece temperature and thus determine a workpiece parameter.

Furthermore, the facility temperatures and/or air temperatures can, for example, be detected by means of one or more sensors 154 formed as thermometers. In particular, such thermometers are the sensors 154 formed as contact temperature sensors 158, for example in the treatment station 106 formed as a dryer 110. By means of such contact temperature sensors 158, in particular the temperature of an air flowing around the contact temperature sensors 158 can be easily determined.

In particular, in a painting facility 108 and/or a dryer 110, the sensors 154 are preferably permanently installed.

In particular, the sensors 154 detect an air temperature in the plenum 122, an air temperature in the filter facility 126 and/or an air temperature in the painting chamber 114.

Furthermore, a pyrometer 156 may be provided in the painting chamber 114, for example, to determine a workpiece temperature of the workpiece 102 contactlessly.

In the dryer 110, for example, permanently installed sensors 154 may be arranged in the recirculation module 128, in the distribution chamber 136 and/or in the dryer chamber 134. Furthermore, sensors 154 can be provided, for example, in the discharge duct 142.

It may be favourable if one or more sensors 154 are arranged in particular in a floor 160 of a treatment station 106.

One or more sensors 154 can, for example, be formed as pyrometers 156 and, in particular, can detect a workpiece temperature on an underside of the workpiece 102 contactlessly.

Figure 5:
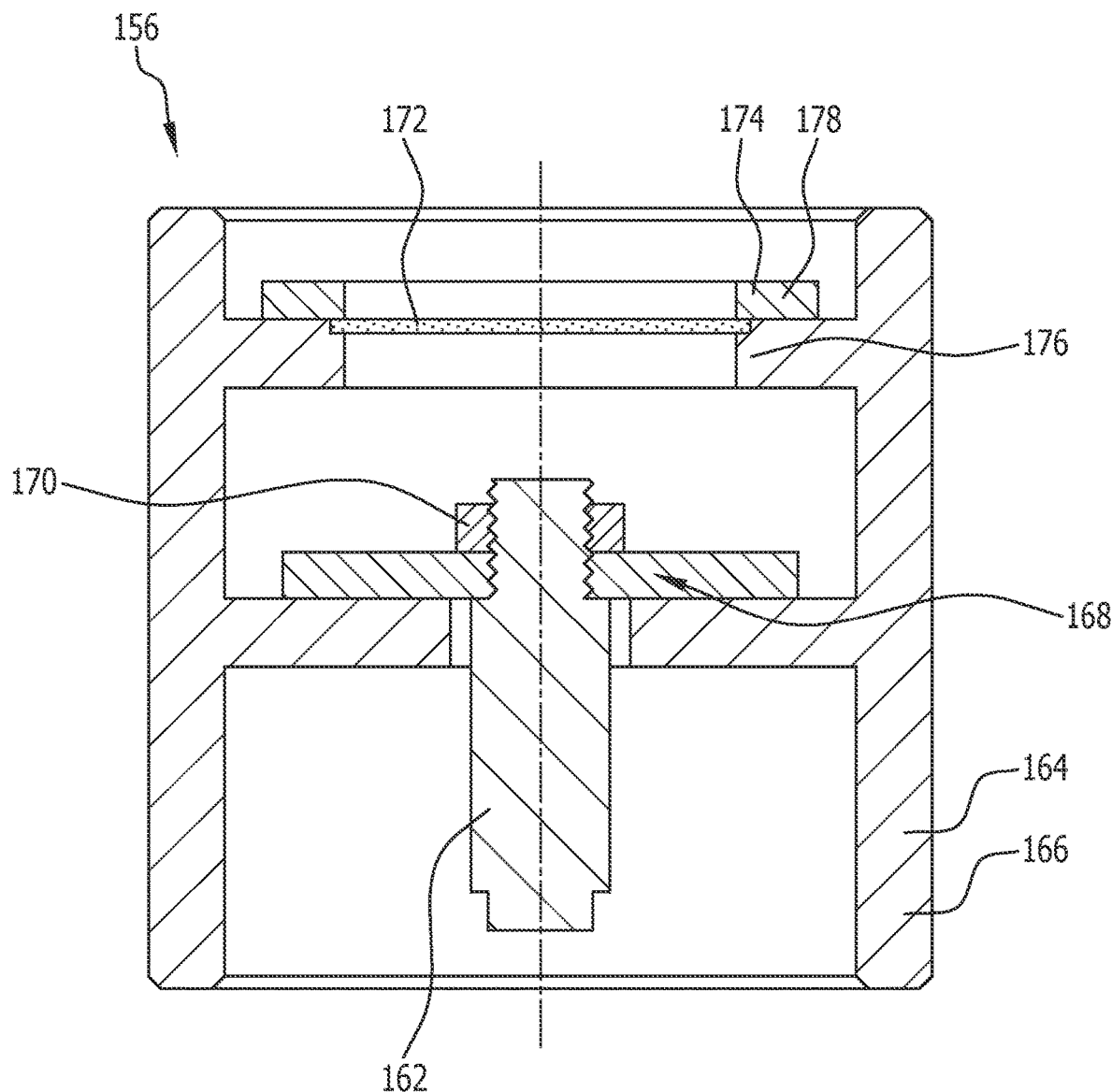
FIG. 5 a schematic sectional view of a sensor formed as a pyrometer.

In particular, to avoid contamination and/or to avoid excessive temperatures at a pyrometer measuring unit 162 of a pyrometer 156, the pyrometer measuring unit 162 can be arranged and/or accommodated in a housing 164, which is constructed, for example, as a bushing 166, as can be seen, for example, from FIG. 5.

In particular, the pyrometer measuring unit 162 is mounted on a receptacle 168 of the housing 164, for example is screwed in and/or fixed by means of a lock nut 170.

At an end of the housing 164 facing the treatment chamber of the particular treatment station 106, the housing preferably has a window element 172 by means of which the pyrometer measuring unit 162 is protected from an atmosphere in the particular respective treatment chamber.

The window element 172 is made of zinc sulphide (ZnS), for example, and thus enables transmission of a wavelength range that includes ultra-violet radiation, visible light and infra-red radiation.

For example, the window element 172 is held on a window support 176 of the housing 164 by means of a retaining element 174 of the pyrometer 156.

The retaining element 174 is, for example, a retaining ring 178 for fixing, in particular clamping, the window element 172.

The pyrometer 156 can also have a cover (not shown) as an alternative or additionally to the window element 172. This cover is then in particular configured to be movable and is preferably only opened when a measurement is to be carried out by means of the pyrometer measuring unit 162. The pyrometer measuring unit 162 can also preferably be efficiently protected by means of such a cover.

Furthermore, an (air) purging (not shown) of the housing 164 and/or a surrounding area of the pyrometer 156 may be provided, in particular to protect the pyrometer measuring unit 162 and/or the window element 172 against heating and/or contamination.

The aforementioned sensors 154 as well as the mentioned positions thereof preferably enable comprehensive data collection, which in particular enables conclusions to be drawn about a treatment result of the workpieces 102.

In particular, by means of the checking station 146, faults in or on a treated surface of the workpiece 102 can preferably be detected and located. This enables an automatic post-treatment of the workpiece 102 in order to remove defects from the workpiece 102.

Figure 6:
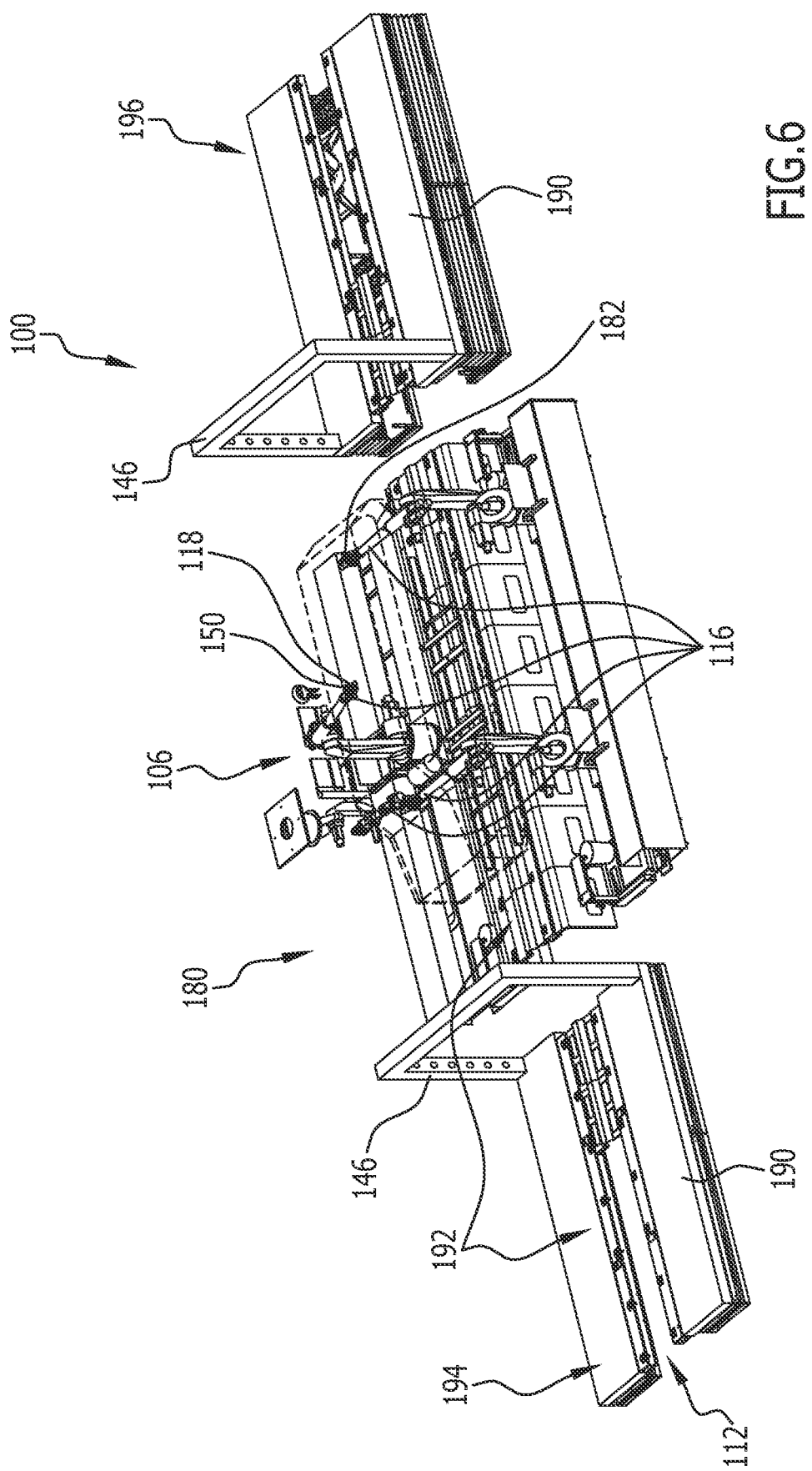
FIG. 6 a schematic perspective view of a post-treatment station of the post-treatment facility.
Figure 7:
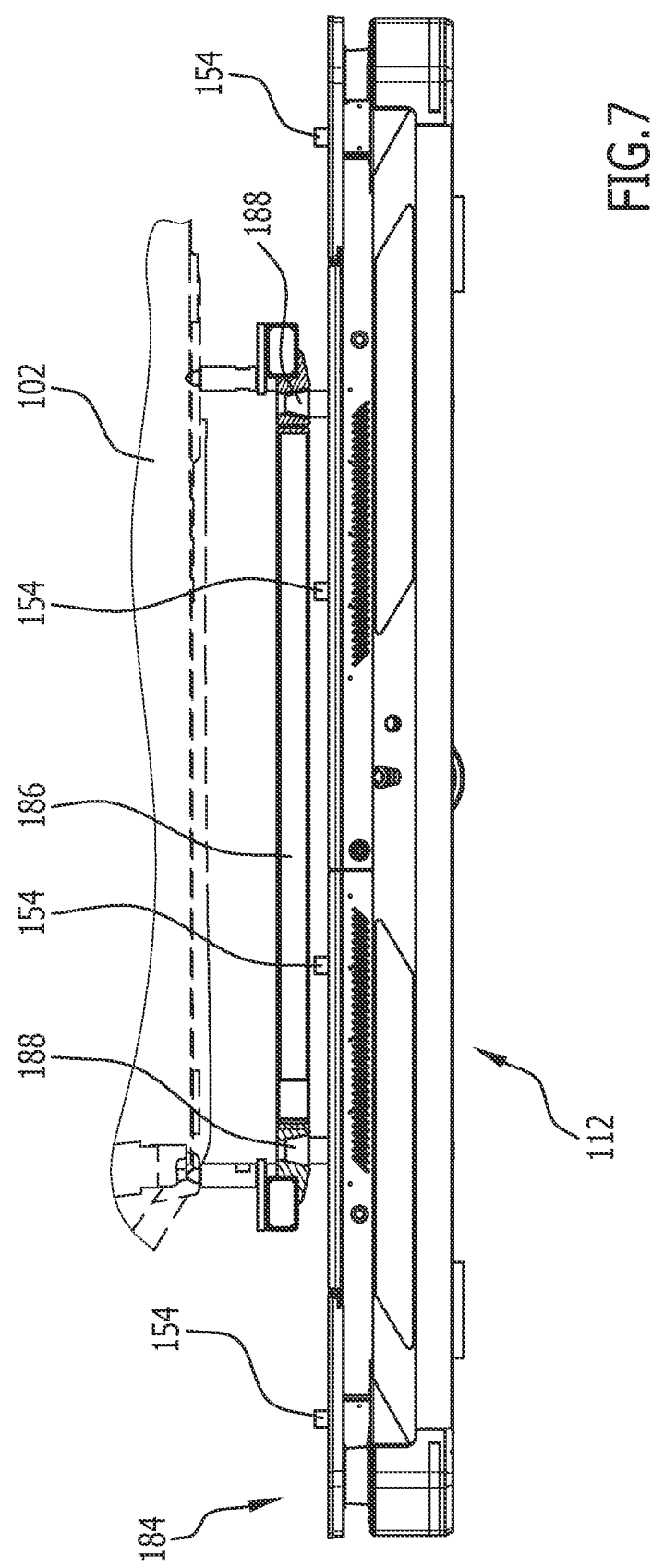
FIG. 7 a schematic side view of a vehicle for transporting workpieces.
Figure 8:
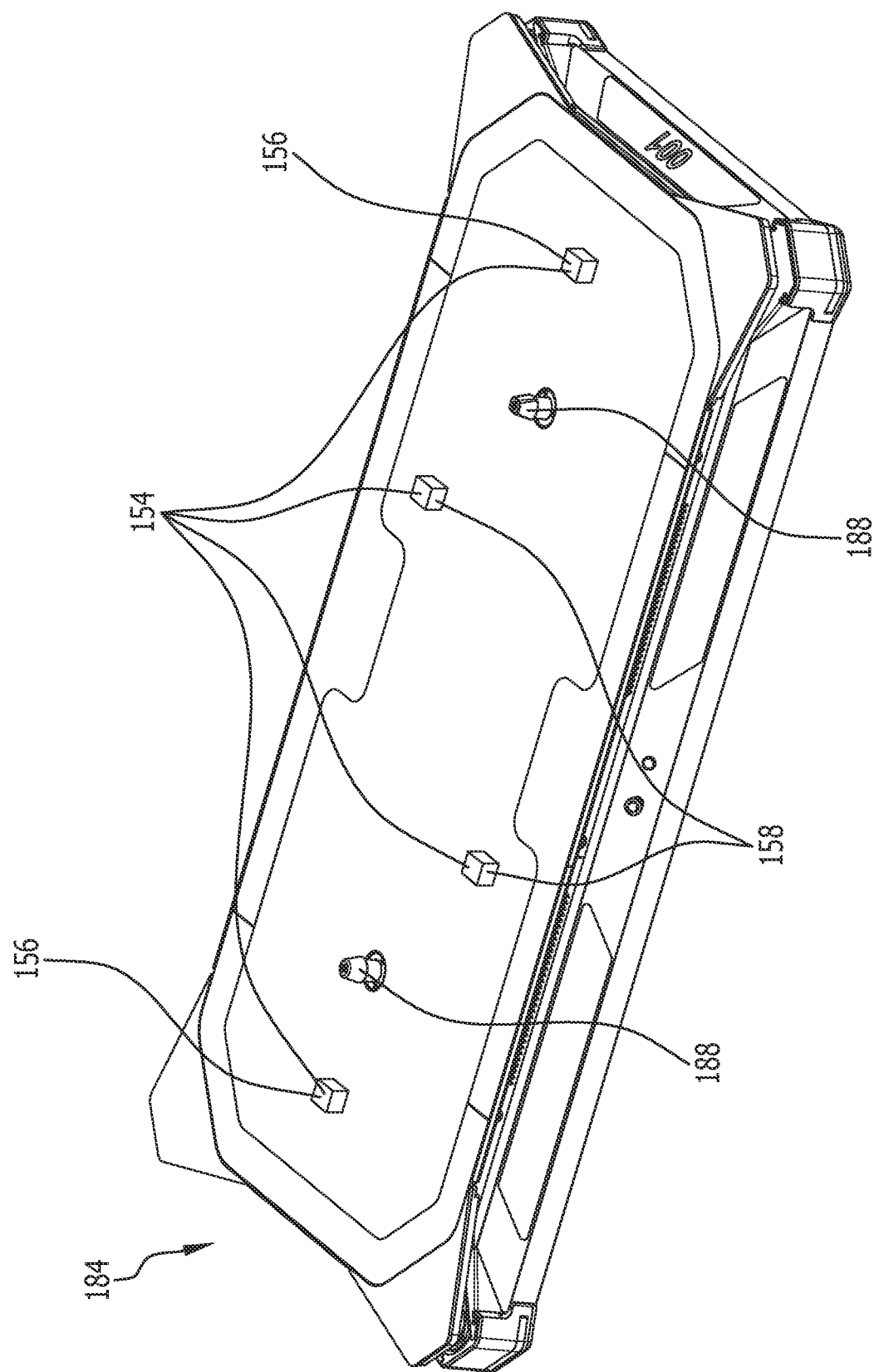
FIG. 8 a schematic perspective view of the vehicle from FIG. 7.

As can be seen in particular from FIG. 6, the treatment facility 100 therefore preferably comprises a post-treatment station 180, which also forms a treatment station 106 of the treatment facility 100.

The post-treatment station 180 preferably comprises one or more treatment units 116.

One or more treatment units 116 are formed, for example, as painting robots 118.

One or more treatment units 118 are formed, for example, as a polishing robot 182.

One or more treatment units 116 are further formed, for example, as a checking unit 150.

In particular, all the treatment units 116 are robots which allow treatment, in particular polishing and/or painting, and/or checking of the workpieces 102.

In particular, the robots can have an interchangeable head (not shown in more detail) so that a treatment, for example a painting process and/or a polishing process and/or a checking of the workpieces 102, can be carried out selectively by means of the same robot.

The post-treatment station 180, in particular the one or more treatment units 116, are controlled in particular by means of a control device (not shown) of the treatment facility 100, in particular using workpiece parameters obtained by means of the checking station 146.

In particular, the position and/or extent and/or nature of a defect, for example an inclusion, on the workpiece 102 is transferred from the checking station 146 to the one or more treatment units 116.

If the workpiece 102 that has been identified as defective by the checking station 146 is automatically supplied to the post-treatment station 180, the workpiece 102 can also be automatically post-treated as a result.

In particular, preferably no user intervention is required to bring the workpiece 102 to a defect-free state.

Preferably, since not every workpiece 102 needs to be post-treated, the conveyor device 112 is preferably a vehicle-based conveyor device 112 after the dryer 110.

As such, this conveyor device comprises in particular a plurality of vehicles 184, which are formed in particular as self-propelled transport vehicles and can be moved independently of one another, in particular autonomously.

The vehicles 184 can be moved freely, in particular on a hall floor or other floor.

The workpieces 102 are arranged on one or more receiving elements 188 of the vehicle 184, in particular by means of an adapter device 186.

By means of the vehicle 184, the workpieces 102 can be supplied to a transfer station 190 of the post-treatment station 180, in particular as required, where they can be transferred to a station conveyor device 192, for example.

The vehicles 184 are then available for further transport tasks, while the particular workpiece 102 is introduced into, guided through and/or guided out of a treatment chamber of the post-treatment station 180 by means of the station conveyor device 192.

At a, in particular, further transfer station 190, the post-treated workpieces 102 can preferably be transferred again from the station conveyor device 192 to the conveyor device 112, for example to the vehicles 184.

As can be seen from FIG. 6, the post-treatment station 180 preferably itself comprises one or more checking stations 146 or is adjacent to one or more checking stations 146.

A checking station 146 at the outlet lock 144 can thus be omitted.

Furthermore, a renewed check by means of a checking station 146 can optionally hereby be carried out directly after a post-treatment in the post-treatment station 180.

Due to the fact that numerous sensors 154 and one or more checking stations 146 are provided in the treatment facility 100, the treatment facility 100 can preferably be operated with a high degree of automation and preferably a highly accurate defect detection and/or an automatic defect removal can be achieved.

Figure 9:
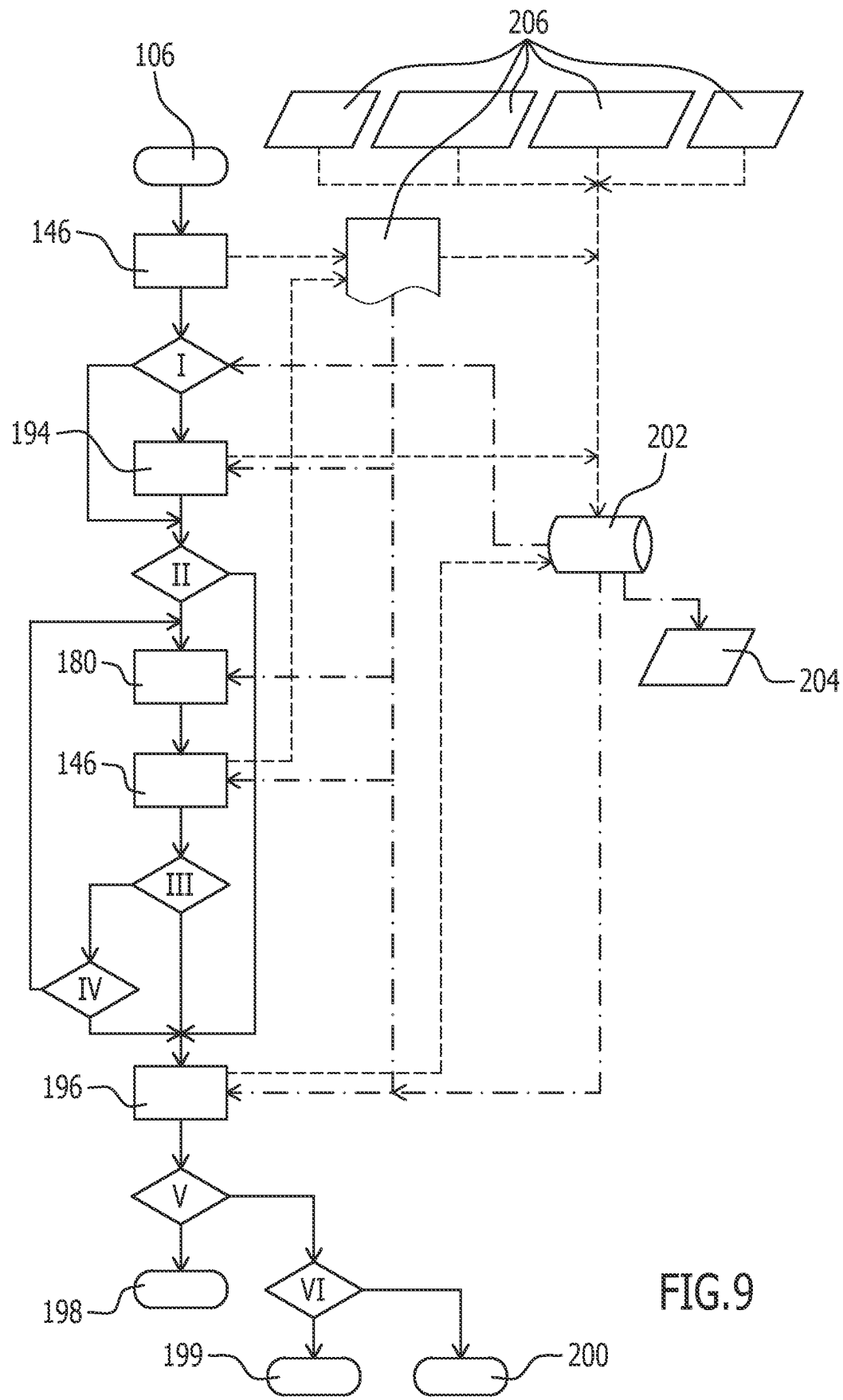
FIG. 9 a diagram illustrating a method sequence for checking and post-treating workpieces.

As can be seen from FIG. 9 by way of example, the following can be provided in particular for one mode of operation of the treatment facility 100:

1. After a treatment station 106, all workpieces 102 move into an automatic fault check (checking station 146);
2. Subsequently, a certain selection (e.g. every second) of the workpieces 102 is routed to a quality measurement (quality inspection station 194). The selection of the workpieces 102 depends, for example, on the hue, the type of workpiece, the nature of the workpiece, the process or other information.
    a. Measured are, for example: layer thickness, structure and hue and only at locations that do not show any faults (assessed using the data from the checking station 146)
    b. These measurements do not always follow the same pattern, but are preferably controlled in a process-defined manner, in particular as required.
3. In the automatic post-treatment station 180, the previously detected faults are remedied. Workpieces 102 that do not have a fault or have already been determined as "rejects" or spot-repair workpieces 102 in a previous station (146 and/or 194) are conveyed directly to a manual post-treatment station 196.
4. Workpieces 102 from the automatic post-treatment station 180 are checked again for faults in the further checking station 146—possibly even the same as before. A renewed "check" shows whether the faults have been remedied or whether new faults have even been added. If there are still faults present, the workpieces 102 are returned to the automatic post-treatment station 180.
5. All workpieces 102 are conveyed to a manual workstation (in particular a manual post-treatment station 196) and specifically checked—if necessary also refinished. Smaller faults are processed directly; for larger faults the workpiece 102 is forwarded to the spot-repair station 199.
6. Lastly, the workpieces 102 are transported to the storage installation 198 (possibly a high-bay storage installation).

The stations 146, 194, 180, 196, 199 can, for example, each be configured as a box or individual space. The workpieces 102 can in particular be conveyed to, deposited on and/or removed from the station by a vehicle 184.

As can be seen in FIG. 9, decisions are made at a plurality of points about the next process step. For this purpose, data (workpiece parameters, facility parameters, operating result parameters) from the database 202 are preferably used for decision-making:

Decision I—Send to quality measurement?:
Arranged after the checking station 146, a decision is made as to whether the workpiece 102 is routed to the quality measurement or to decision field II.
The following workpieces 102 are routed to the quality measurement:
A sample of X—can be decided by the manufacturer
Based on information from the workpiece-specific data set, body-in-white, process engineering, process technology or colour mixing space (which are indicated as input 206 in FIG. 9)
Those workpieces 102 which experienced a malfunction or a deviation in the process
Workpieces 102 to which a new hue has been applied
New workpieces
Marked workpieces 102, i.e. workpieces 102 that have been marked for checking during the course of the process (for example body shop or paint shop) for different reasons. This means that a workpiece does not have to be tracked in a cumbersome manner. When marking, the operator has the option of specifying which part of the workpiece is to be checked in more detail. The process step from which the workpiece 102 was marked is also logged.

If none of these criteria are met, decision II follows

Decision II—Send to post-treatment?:

Arranged after the quality inspection station 194 and after decision I, it is decided whether the workpiece 102 is routed to the automatic post-treatment station 180, in particular for automatic grinding and polishing, or to decision III.

The following workpieces 102 are routed to the automatic post-treatment station 180, in particular for automatic sanding and polishing:

Those that have a fault that can be sanded or polished

If this criterion is not met, decision III follows

Decision III—Workpiece OK?

Arranged after the second fault check (checking station 146), a decision is made as to whether the particular workpiece 102 is routed to the manual workstation (manual post-treatment station 196) or to decision IV.

The following workpieces 102 are routed to the manual post-treatment station 196:

Workpieces 102 that are assessed as OK after the second fault check (checking station 146).

All defects were able to be successfully processed

If none of these criteria are met, decision IV follows

Decision IV—Number of runs>x?

Arranged after decision III, it is decided whether the workpiece is routed to the manual post-treatment station 196 or to the automatic post-treatment station 180, in particular for automatic sanding and polishing.

The following workpieces 102 that meet all of the criteria below are routed to the manual post-treatment station 196:

Workpieces 102 that are still defective

Individual defects have been processed at least x times

If not all of these criteria are met, the workpiece 102 is again reworked in the automatic post-treatment station 180.

Further or alternative decision III:

Arranged after the second fault check (checking station 146) and after decision II, it is decided whether the workpiece 102 is routed to the manual workstation (manual post-treatment station 196) or to decision IV.

The following workpieces 102 are routed to the manual workstation:

Initially all

Workpieces 102 that could not be completely scanned for faults

Workpieces 102 of a new type, with a new colour or other features that have been tried out Defective workpieces 102 after the fault check 2

A sample of X—can be decided by the manufacturer

Defective workpieces 102 after fault check 1, if the faults cannot be repaired by automatic sanding or polishing Workpieces 102 selected by the operator Workpieces 102 that show anomalies from the process, body-in-white, process engineering or others If none of these criteria is met, decision V follows.

Decision V:

Arranged after the manual workstation (manual post-treatment station 196) and after decision IV, it is decided whether the workpiece 102 is routed to the storage installation 198 or to decision VI.

The following workpieces 102 are routed to the storage installation 198

Workpieces 102 that are OK

Decision VI:

Arranged after decision V, it is decided whether the workpiece 102 is conveyed to the spot-repair station 199 or is to be regarded as a reject 200. In the latter case, the workpiece 102 can be declared to be what is known as a second run and optionally can be routed likewise to the storage installation 198.

The following workpieces are routed to the spot-repair station 199:

Defective workpieces 102 after fault check 1 (checking station 146), if the fault cannot be polished out automatically or manually Defective workpieces 102 after the manual workstation Workpieces 102 with faults that are only on a few workpieces 102 and can still be remedied.

Figure 10:
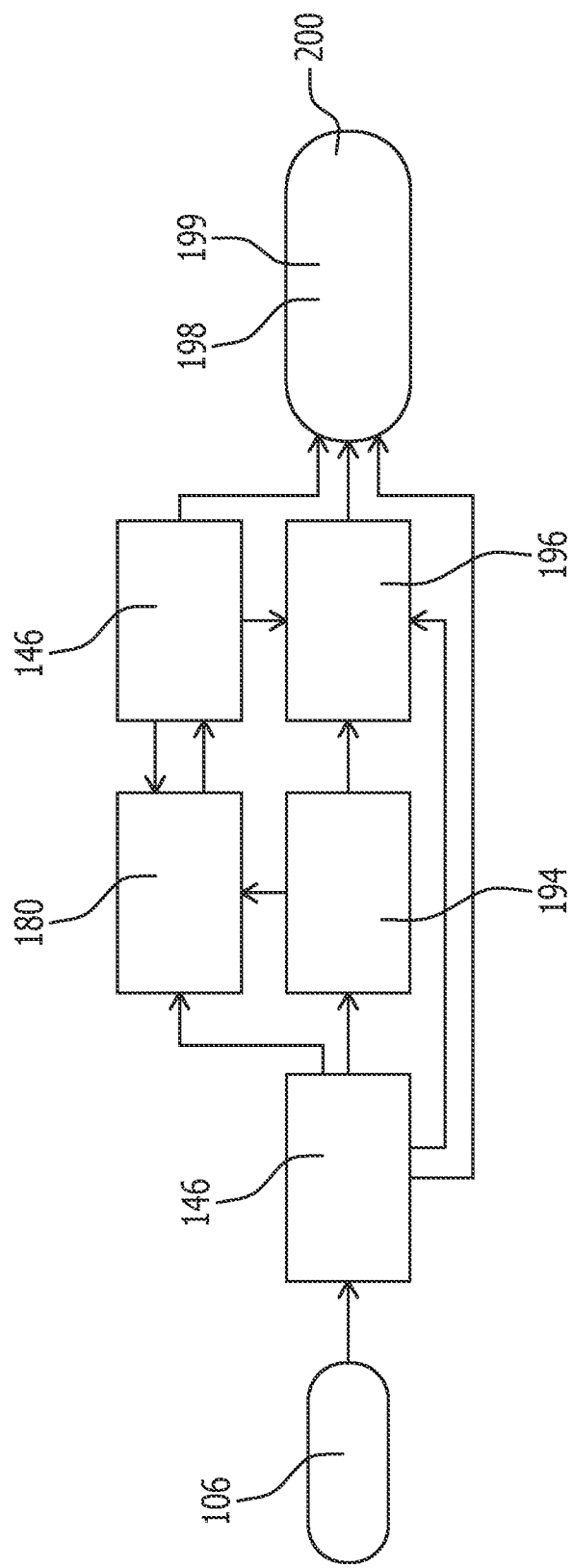
FIG. 10 another diagram illustrating the method sequence in simplified form.
Figure 11:
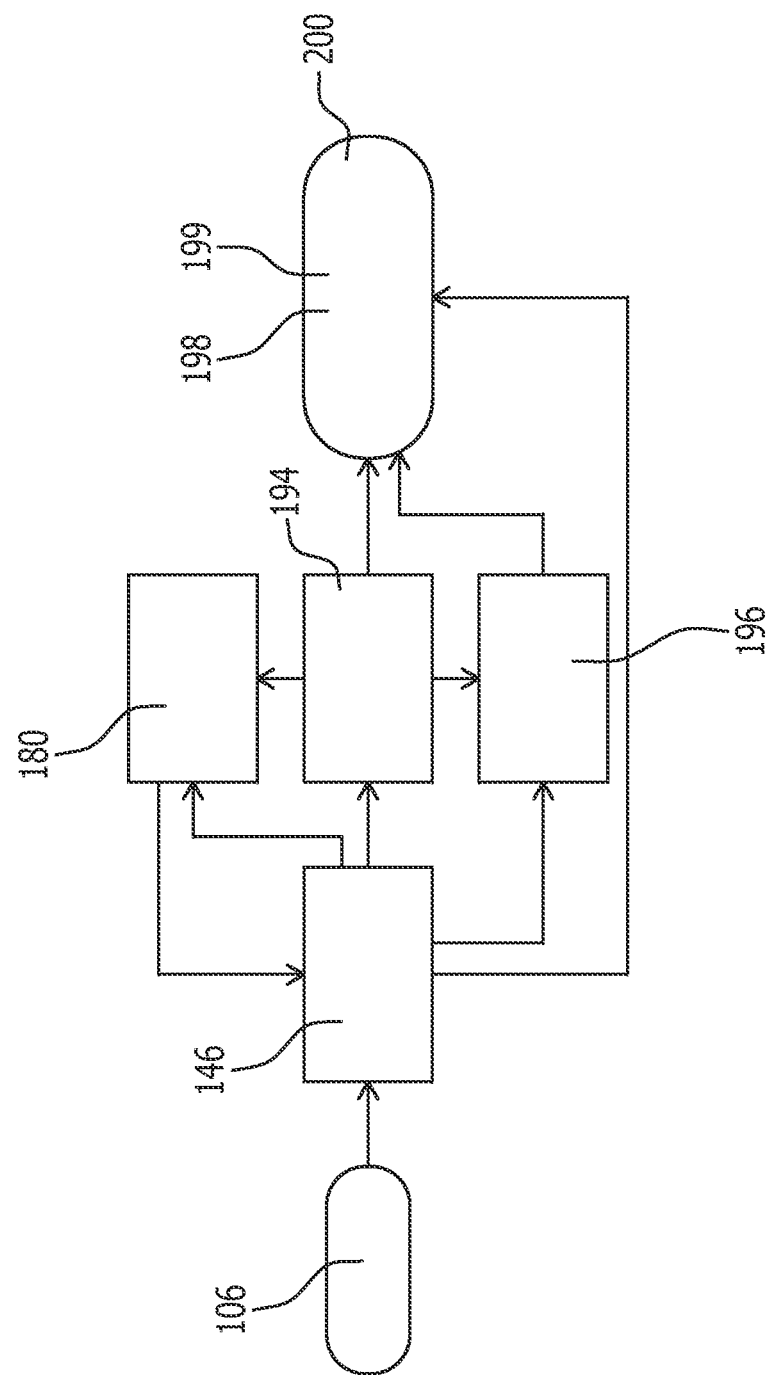
FIG. 11 another diagram illustrating an alternative method sequence.

Based on the decision fields described above, there are different movement possibilities for the workpiece 102, which are shown again in FIG. 10. If the checking stations 146 are combined, the movement options are as shown in FIG. 11.

Preferred embodiments are the following:

1. A method for checking workpieces (102), in particular vehicle bodies (104), wherein the method comprises the following steps:
    determining one or more workpiece parameters of the workpieces (102) to be checked and/or one or more facility parameters of a treatment facility (100) for treating the workpieces (102) to be checked;
    processing and/or compiling the one or more workpiece parameters and/or the one or more facility parameters, wherein a workpiece-specific data set is created for each workpiece (102).

2. A method in accordance with embodiment 1, characterised in that it is determined by means of the data sets individually for each workpiece (102) or jointly for a plurality of workpieces (102) whether the treatment of the particular workpiece (102) or workpieces (102) has led or will lead to a treatment result within predefined quality criteria.

3. A method in accordance with embodiment 2, characterised in that the determination is carried out before the treatment of the particular workpiece (102) or workpieces (102), during the treatment of the particular workpiece (102) or workpieces (102) and/or after the treatment of the particular workpiece (102) or workpieces (102).

4. A method in accordance with embodiments 1 to 3, characterised in that one or more of the following parameters are provided as workpiece parameters:
    workpiece temperature measured locally;
    areally measured and/or averaged workpiece temperature or workpiece temperature distribution;
    local speed, measured in particular by means of a sensor in the form of an anemometer, in particular flow speed of the air at and/or around the workpiece;
    measured reflection properties of a workpiece surface;
    measured absorption properties of a workpiece surface;
    measured emission properties of a workpiece surface;
    determined local workpiece temperature on the basis of a simulation;
    temperature distribution on the workpiece (102), determined on the basis of a simulation;

information about the nature and/or type of the particular workpiece (102);

information about physical and/or production-related workpiece characteristics;

an individual workpiece identification number;

information about a manufacture and/or processing of the particular workpiece (102) preceding the treatment;

information about a post-treatment and/or further processing of the particular workpiece (102) following the treatment.

5. A method in accordance with embodiments 1 to 4, characterised in that one or more of the following parameters are provided as facility parameters:

globally measured temperature and/or measured temporal and/or spatial temperature distribution in one or more treatment stations (106);

one or more operating parameters of one or more air-guiding devices (124) of one or more treatment stations (106);

one or more operating parameters of one or more conveyor devices (112) of one or more treatment stations (106);

one or more operating parameters of one or more treatment units (116) of one or more treatment stations (106);

one or more operating parameters of one or more filter facilities (126) and/or cleaning facilities for removing contaminants from an airflow and/or a treatment medium for workpiece treatment.

6. A method in accordance with embodiments 1 to 5, characterised in that correlation data are used to create the workpiece-specific data sets, which correlation data establish a correlation between a) the one or more workpiece parameters and/or the one or more facility parameters and b) one or more treatment result parameters.

7. A method in accordance with embodiment 6, characterised in that simulation data and/or simulation functions are used as correlation data or for determining the correlation data, by means of which simulation data and/or simulation functions one or more treatment parameters and/or one or more treatment result parameters are calculated on the basis of the one or more workpiece parameters and/or the one or more facility parameters.

8. A method in accordance with embodiments 1 to 7, characterised in that one or more sensory treatment result parameters are determined by means of one or more sensors (154) during and/or after the performance of the treatment, and in that the one or more sensory treatment result parameters are compared with one or more predefined and/or simulated treatment result parameters, wherein in particular a quality parameter is obtained which reflects whether the treatment of the particular workpiece (102) fulfils one or more quality criteria.

9. A method in accordance with embodiments 6 to 8, characterised in that one or more of the following parameters are provided as treatment result parameters:

thickness of a coating;

quality of a coating and/or a substrate surface, in particular evenness and/or roughness of a coating, in particular of each layer or individual layers;

uniformity of a layer thickness of a coating;

hue and/or brightness and/or "colour match" of a coating;

hardness of a coating;

chemical composition of a coating, in particular degree of cross-linking and/or solvent content;

degree of contamination of a coating;

spatial distribution and/or temporal course of the temperature of the workpiece (102) during and/or after the performance of a treatment;

position of local temperature maxima and/or temperature minima generated by the treatment on the workpiece (102);

information about measured, simulated and/or expected defects or other quality deficiencies on the particular workpiece (102), in particular position and/or extent of coating faults.

10. A method in accordance with embodiments 1 to 9, characterised in that the workpiece-specific data sets are supplemented by:

one or more workpiece-specific sensory treatment result parameters;

one or more workpiece-specific predefined treatment result parameters;

one or more workpiece-specific simulated treatment result parameters;

one or more quality parameters.

11. A method in accordance with embodiments 1 to 10, characterised in that the data sets of a plurality of workpieces (102) are compared with one another, correlated and/or combined, wherein a process data set is obtained which in particular represents a development over time of one or more facility parameters, one or more workpiece parameters and/or one or more treatment result parameters.

12. A method in accordance with embodiment 11, characterised in that the process data set is evaluated, in particular by means of a data mining method and/or a deep learning method, in order to draw conclusions about possible sources and/or causes of determined and/or expected quality deficiencies on the workpieces (102).

13. A method in accordance with embodiments 1 to 12, characterised in that a treatment facility (100) for treating the workpieces (102), in particular one or more treatment stations (106) of the treatment facility (100), is controlled with regard to one or more facility parameters depending on one or more workpiece-specific data sets and/or depending on a process data set available from a plurality of workpiece-specific data sets.

14. A method in accordance with embodiments 1 to 13, characterised in that a conveyor device (112) is controlled depending on one or more workpiece-specific data sets and/or depending on a process data set obtainable from a plurality of workpiece-specific data sets, in particular for varying and/or selecting a conveying path along which a particular workpiece (102) is conveyed, in particular for treating the same.

15. A method in accordance with embodiments 1 to 14, characterised in that the workpieces (102), after one or more treatment steps have been performed in one or more treatment stations (106), are supplied to one or more post-treatment stations (180) depending on the content of the particular workpiece-specific data set.

16. A method in accordance with embodiment 15, characterised in that the post-treatment stations (180) are automatic treatment stations (106), and in that the workpieces (102) are reworked therein, in particular automatically, at those defective points or regions with other quality deficiencies which are stored as such in the particular workpiece-specific data set.

17. A method in accordance with embodiments 15 or 16, characterised in that the workpiece-specific data sets of the workpieces (102) are modified and/or supplemented during and/or after the post-treatment, in particular by workpiece parameters which relate to the performance of the post-treatment, and/or by facility parameters which relate to one or more post-treatment stations (180), and/or by treatment result parameters which are treatment-specific and/or workpiece-specific and arise as a result of the post-treatment.

18. A method in accordance with embodiments 15 to 17, characterised in that the workpieces (102) are supplied to one or more further post-treatment stations (180) after one or more post-treatment steps have been performed, depending on the modified and/or supplemented content of the particular workpiece-specific data set.

19. A checking facility for checking workpieces (102), in particular vehicle bodies (104), wherein the checking facility comprises the following:
a checking station (146) for determining one or more workpiece parameters of the workpieces (102) to be checked and/or one or more facility parameters of a treatment facility (100) for treating the workpieces (102) to be checked;
a control device which is set up and configured in such a way that a workpiece-specific data set can be created for each workpiece (102) by means of the control device based on the one or more workpiece parameters and/or based on the one or more facility parameters, in particular by a method in accordance with one of embodiments 1 to 18.

20. A treatment facility (100) for treating workpieces (102), in particular for treating vehicle bodies (104), wherein the treatment facility (100) comprises the following:
one or more treatment stations (106) for treating the workpieces (102);
a checking facility for checking workpieces (102), in particular a checking facility in accordance with embodiment 19;
a conveyor device (112) by means of which workpieces (102) can be conveyed to one or more checking stations (146) of the checking facility, through the one or more checking stations (146) and/or away from the one or more checking stations (146) and/or by means of which workpieces (102) can be conveyed to one or more treatment stations (106), through one or more treatment stations (106) and/or away from the one or more treatment stations (106).

21. A method for checking workpieces (102), in particular a method in accordance with embodiments 1 to 18, wherein the method comprises:
determining one or more workpiece parameters of the workpieces (102) to be checked by means of an automatic checking station (146);
categorising the workpieces (102) depending on at least one of the workpiece parameters determined by means of the checking station (146).

22. A method in accordance with embodiment 21, characterised in that workpieces (102) are post-treated, in which case one or more workpiece parameters are determined by means of the checking station (146) which are to be classified as defective or which result in a defect on the workpiece (102).

23. A method in accordance with embodiments 21 or 22, characterised in that workpieces (102) are not subjected to post-treatment if all workpiece parameters determined by means of the checking station (146) are to be classified as free of defects and do not result in any defects on the workpiece (102).

24. A method in accordance with embodiments 21 to 23, characterised in that one or more workpieces (102) are supplied to a quality inspection station (194) downstream of the checking station (146).

25. A method in accordance with embodiment 24, characterised in that the workpieces (102) supplied to the quality inspection station (194) are a selection from all manufactured and/or treated workpieces (102), and in that only these workpieces (102) are subjected to a quality inspection.

26. A method in accordance with embodiment 25, characterised in that the selection of the workpieces (102) to be supplied to the quality inspection station (194) is made based on measured and/or calculated and/or simulated workpiece parameters and/or based on measured and/or calculated and/or simulated treatment result parameters, in particular based on one or more of the following parameters:
hue and/or brightness and/or colour match and/or gradient and/or gloss level of a coating;
quality of a coating and/or a substrate surface, in particular evenness and/or roughness of a coating, in particular of each layer or individual layers;
uniformity of a layer thickness of a coating;
thickness of a coating;
hardness of a coating;
chemical composition of a coating, in particular degree of cross-linking and/or solvent content;
information about the nature and/or type of the particular workpiece (102);
information about physical and/or production-related workpiece characteristics;
an individual workpiece identification number;
information about a manufacture and/or processing of the particular workpiece (102) preceding the treatment;
information about a post-treatment and/or further processing of the particular workpiece (102) following the treatment;
information about measured, simulated and/or expected defects or other quality deficiencies on the particular workpiece (102), in particular position and/or extent of coating faults.

27. A method in accordance with embodiments 24 to 26, characterised in that one or more of the following parameters are measured during the quality inspection:
hue and/or brightness and/or colour match and/or gradient and/or gloss level of a coating;
quality of a coating and/or a substrate surface, in particular evenness and/or roughness of a coating, in particular of each layer or individual layers;
uniformity of a layer thickness of a coating;
thickness of a coating;
hardness of a coating;
chemical composition of a coating, in particular degree of cross-linking and/or solvent content;
degree of contamination of a coating;
reflection properties of a workpiece surface;
absorption properties of a workpiece surface;
emission properties of a workpiece surface.

28. A method in accordance with embodiments 24 to 27, characterised in that, during the quality inspection, quality measurements are performed only at those points of the workpieces (102) which are free of defects according to a result of the check in the checking station (146).

29. A method in accordance with embodiments 24 to 28, characterised in that results of the quality measurements are used for adjusting one or more facility parameters, in particular in one or more treatment stations (106) for treating the workpieces (102).

30. A method in accordance with embodiments 24 to 29, characterised in that, based on results of the quality measurements, an adjustment of one or more facility parameters, in particular in one or more treatment stations (106) for treating the workpieces (102), is performed even if the one or more facility parameters lie within predefined limit values, wherein in particular drifts in a temporal development of the one or more facility parameters are already mitigated or compensated.

31. A checking facility for checking workpieces (102), in particular checking facility in accordance with embodiment 19, wherein the checking facility comprises:
   one or more checking stations (146) for automatically determining one or more workpiece parameters of the workpieces (102) to be checked;
   a control device which is set up and configured in such a way that the workpieces (102) can be categorised by means of the control device depending on at least one of the workpiece parameters determined by means of the one or more checking stations (146), in particular by a method in accordance with embodiments 21 to 30.

32. A checking facility in accordance with embodiment 31, characterised in that one or more checking stations (146) each comprise one or more checking units (150) which are formed as robots or comprise a robot.

33. A checking facility in accordance with embodiments 31 or 32, characterised in that one or more checking stations (146) are formed as a gantry (148), through which the workpieces (102) can be conveyed in order to be checked.

34. A treatment facility (100) for treating workpieces (102), in particular for treating vehicle bodies (104), wherein the treatment facility (100) comprises the following:
   one or more treatment stations (106) for treating the workpieces (102);
   a checking facility for checking workpieces (102), in particular a checking facility in accordance with embodiments 19 or 31 to 33;
   a conveyor device (112) by means of which workpieces (102) can be conveyed to one or more checking stations (146) of the checking facility, through the one or more checking stations (146) and/or away from the one or more checking stations (146) and/or by means of which workpieces (102) can be conveyed to one or more treatment stations (106), through one or more treatment stations (106) and/or away from the one or more treatment stations (106).

35. A treatment facility (100) in accordance with embodiment 34, characterised in that one or more checking stations (146) are integrated into a treatment station (106) and/or into a post-treatment station (180) of the treatment facility (100), and in that a check of the particular workpiece (102) can be performed by means of one or more treatment units (116) of the treatment station (106) and/or of the post-treatment station (180), which each have one or more checking units (150).

36. A checking facility for checking workpieces (102), in particular in accordance with embodiments 19 and 31 to 33, wherein the checking facility comprises:
   one or more checking stations (146), which each comprise one or more checking units (150).

37. A checking facility in accordance with embodiment 36, characterised in that one or more checking stations (146) each form or comprise one or more receiving devices (152) for portable and/or mobile checking units (150) for temporarily receiving the latter.

38. A checking facility in accordance with embodiments 36 or 37, characterised in that one or more checking stations (146) each comprise one or more permanently installed checking units (150).

39. A checking facility in accordance with embodiments 36 to 38, characterised in that one or more checking stations (146) are formed as a gantry (148), through which the workpieces (102) can be conveyed in order to be checked.

40. A checking facility in accordance with embodiments 36 to 39, characterised in that one or more checking stations (146) are formed as a gantry (148) which can be moved over the workpieces (102) in order to check them.

41. A checking facility in accordance with embodiments 39 or 40, characterised in that one or more checking stations (146) formed as a gantry (148) are integrated in a lock, in particular an outlet lock (144) of a treatment facility (100) or form a lock, with which a checking region of the particular checking station (146) can be purged with a purging medium, for example fresh air, in particular in order to avoid measurement errors.

42. A checking facility in accordance with embodiments 36 to 41, characterised in that one or more checking units (150) are arranged in a treatment station (106) and/or on a treatment unit (116) for treating the workpiece (102).

43. A checking facility in accordance with embodiments 36 to 42, characterised in that one or more checking units (150) are integrated into a floor, a wall and/or a ceiling of a treatment station (106).

44. A checking facility in accordance with embodiments 36 to 43, characterised in that one or more checking units (150) are arranged on a robot, for example a sanding robot, a painting robot (118) and/or a polishing robot (182).

45. A checking facility in accordance with embodiment 44, characterised in that the workpieces (102) can be simultaneously checked by means of the one or more checking units (150) and treated, in particular sanded, painted and/or polished, by means of the robot.

46. A checking facility in accordance with embodiment 44, characterised in that the robot has an exchanging device and/or rotation device by means of which a sanding unit and/or a polishing unit and/or a painting unit and/or one or more checking units can be selectively aligned with the workpiece (102), in particular for selectively sanding, polishing, painting and/or checking the workpiece (102).

47. A checking facility in accordance with embodiments 36 to 46, characterised in that one or more checking units (146) are formed as pyrometers (156) or comprise one or more pyrometers (156).

48. A checking facility in accordance with embodiments 36 to 47, characterised in that one or more checking units (146) have a cover, by means of which the particular checking unit (146) can be covered, in particular during treatment of the workpiece (102), wherein the cover can be brought, in particular automatically, for example in a motorised fashion, selectively into an open position and into a closed position.

49. A checking facility in accordance with embodiments 36 to 48, characterised in that the checking facility comprises a purging device, in particular a compressed air device, by means of which a measurement region of a workpiece (102) to be detected by means of a checking unit can be acted exposed to a purging medium and preferably freed of contaminants.

50. A checking facility in accordance with embodiment 49, characterised in that the purging device is arranged on a robot, for example a sanding robot, a painting robot (118) and/or a polishing robot (182), and can be aligned with the measurement region of the workpiece (102) to be detected by means of the robot.

The invention claimed is:

1. A method for checking workpieces including vehicle bodies, the method comprising:
    determining one or more workpiece parameters of the workpieces to be checked and/or one or more facility parameters of a treatment facility for treating the workpieces to be checked, wherein one or more of the following parameters are provided as workpiece parameters:
        workpiece temperature measured locally;
        areally measured and/or averaged workpiece temperature or workpiece temperature distribution;
        local speed, measured in particular by a sensor in the form of an anemometer, in particular flow speed of the air at and/or around the workpiece;
        measured reflection properties of a workpiece surface;
        measured absorption properties of a workpiece surface;
        measured emission properties of a workpiece surface;
        determined local workpiece temperature on the basis of a simulation;
        temperature distribution on the workpiece, determined on the basis of a simulation;
        information about the nature and/or type of the particular workpiece;
        information about physical and/or production-related workpiece characteristics;
        an individual workpiece identification number;
        information about a manufacture and/or processing of the particular workpiece preceding the treatment; or
        information about a post-treatment and/or further processing of the particular workpiece following the treatment; and
    at least one of processing or compiling the one or more workpiece parameters and/or the one or more facility parameters, wherein a workpiece-specific data set is created for each workpiece.

2. A method in accordance with claim 1, wherein it is determined by the data sets, individually for each workpiece or jointly for a plurality of workpieces, whether the treatment of the particular workpiece or workpieces has led or will lead to a treatment result within predefined quality criteria.

3. A method in accordance with claim 2, wherein the determination is carried out before the treatment of the particular workpiece or workpieces, during the treatment of the particular workpiece or workpieces and/or after the treatment of the particular workpiece or workpieces.

4. A method in accordance with claim 1, wherein one or more of the following parameters are provided as facility parameters:
    globally measured temperature and/or measured temporal and/or spatial temperature distribution in one or more treatment stations;
    one or more operating parameters of one or more air-guiding devices of one or more treatment stations;
    one or more operating parameters of one or more conveyor devices of one or more treatment stations;
    one or more operating parameters of one or more treatment units of one or more treatment stations; or
    one or more operating parameters of one or more filter facilities and/or cleaning facilities for removing contaminants from an airflow and/or a treatment medium for workpiece treatment.

5. A method in accordance with claim 1, wherein correlation data are used to create the workpiece-specific data sets, which correlation data establish a correlation between a) the one or more workpiece parameters and/or the one or more facility parameters and b) one or more treatment result parameters.

6. A method in accordance with claim 5, wherein simulation data and/or simulation functions are used as correlation data or for determining the correlation data, by which simulation data and/or simulation functions one or more treatment parameters and/or one or more treatment result parameters are calculated on the basis of the one or more workpiece parameters and/or the one or more facility parameters.

7. A method in accordance with claim 1, wherein one or more sensory treatment result parameters are determined by one or more sensors during and/or after the performance of the treatment, and wherein the one or more sensory treatment result parameters are compared with one or more predefined and/or simulated treatment result parameters, wherein in particular a quality parameter is obtained which reflects whether the treatment of the particular workpiece fulfils one or more quality criteria.

8. A method in accordance with claim 5, wherein one or more of the following parameters are provided as treatment result parameters:
    thickness of a coating;
    quality of a coating and/or a substrate surface, in particular evenness and/or roughness of a coating, in particular of each layer or individual layers;
    uniformity of a layer thickness of a coating;
    hue and/or brightness and/or colour match and/or flow and/or gloss level of a coating;
    hardness of a coating;
    chemical composition of a coating, in particular degree of cross-linking and/or solvent content;
    degree of contamination of a coating;
    spatial distribution and/or temporal course of the temperature of the workpiece during and/or after the performance of a treatment;
    position of local temperature maxima and/or temperature minima generated by the treatment on the workpiece; or
    information about measured, simulated and/or expected defects or other quality deficiencies on the particular workpiece, in particular position and/or extent of coating faults.

9. A method in accordance with claim 1, wherein the workpiece-specific data sets are supplemented by:

one or more workpiece-specific sensory treatment result parameters;

one or more workpiece-specific predefined treatment result parameters;

one or more workpiece-specific simulated treatment result parameters; and one or more quality parameters.

10. A method in accordance with claim 1, wherein the data sets of a plurality of workpieces are compared, correlated and/or combined with one another, and wherein a process data set is obtained which in particular reflects a development over time of one or more facility parameters, one or more workpiece parameters and/or one or more treatment result parameters.

11. A method in accordance with claim 10, wherein the process data set is evaluated, in particular by a data mining method and/or a deep learning method, in order to draw conclusions about possible sources and/or causes of determined and/or expected quality deficiencies on the workpieces.

12. A method in accordance with claim 1, wherein a treatment facility for treating the workpieces, in particular one or more treatment stations of the treatment facility, is controlled with regard to one or more facility parameters depending on one or more workpiece-specific data sets and/or depending on a process data set available from a plurality of workpiece-specific data sets.

13. A method in accordance with claim 1, wherein a conveyor device-is controlled depending on one or more workpiece-specific data sets and/or depending on a process data set available from a plurality of workpiece-specific data sets, in particular to vary and/or select a conveying path along which a particular workpiece is conveyed, in particular to treat said workpiece.

14. A method in accordance with claim 1, wherein the workpieces, after one or more treatment steps have been performed in one or more treatment stations, are supplied to one or more post-treatment stations depending on the content of the particular workpiece-specific data set.

15. A method in accordance with claim 14, wherein the post-treatment stations are automatic treatment stations, and wherein the workpieces are reworked therein, in particular automatically, at those imperfections or regions with other quality deficiencies which are stored as such in the particular workpiece-specific data set.

16. A method in accordance with claim 14, wherein the workpiece-specific data sets of the workpieces are modified and/or supplemented during and/or after the post-treatment, in particular by workpiece parameters which relate to the performance of the post-treatment, and/or by facility parameters which relate to one or more post-treatment stations, and/or by treatment result parameters which are treatment-specific and/or workpiece-specific and arise as a result of the post-treatment.

17. A method in accordance with claim 14, wherein the workpieces are supplied to one or more further post-treatment stations after one or more post-treatment steps have been performed, depending on the modified and/or supplemented content of the particular workpiece-specific data set.

18. A checking facility for checking workpieces including vehicle bodies, the checking facility comprising:
a checking station for determining one or more workpiece parameters of the workpieces to be checked and/or one or more facility parameters of a treatment facility for treating the workpieces to be checked; and
a control device which is set up and configured in such a way that a workpiece-specific data set can be created for each workpiece by the control device based on the one or more workpiece parameters and/or based on the one or more facility parameters, in particular by a method in accordance with claim 1.

19. A treatment facility for treating workpieces, in particular for treating vehicle bodies, wherein the treatment facility comprises the following:
one or more treatment stations for treating the workpieces;
a checking facility for checking workpieces, in particular a checking facility in accordance with claim 18; and
a conveyor device by which workpieces can be conveyed to one or more checking stations of the checking facility, through the one or more checking stations and/or away from the one or more checking stations and/or by which workpieces can be conveyed to one or more treatment stations, through one or more treatment stations and/or away from the one or more treatment stations.

20. A method for checking workpieces including vehicle bodies, the method comprising:
determining one or more workpiece parameters of the workpieces to be checked and/or one or more facility parameters of a treatment facility for treating the workpieces to be checked;
at least one of processing or compiling the one or more workpiece parameters and/or the one or more facility parameters, wherein a workpiece-specific data set is created for each workpiece; and
controlling, with a control device, one or more facility parameters depending on one or more workpiece-specific data sets and/or depending on a process data set available from a plurality of workpiece-specific data sets.

* * * * *